US011694647B2

(12) United States Patent
Hayashi

(10) Patent No.: US 11,694,647 B2
(45) Date of Patent: Jul. 4, 2023

(54) DISPLAY DEVICE

(71) Applicant: Japan Display Inc., Tokyo (JP)

(72) Inventor: Hirotaka Hayashi, Tokyo (JP)

(73) Assignee: Japan Display Inc., Tokyo (JP)

( * ) Notice: Subject to any disclaimer, the term of this patent is extended or adjusted under 35 U.S.C. 154(b) by 118 days.

(21) Appl. No.: 17/343,858

(22) Filed: Jun. 10, 2021

(65) Prior Publication Data

US 2021/0295796 A1 Sep. 23, 2021

Related U.S. Application Data

(63) Continuation of application No. PCT/JP2019/044443, filed on Nov. 12, 2019.

(30) Foreign Application Priority Data

Dec. 11, 2018 (JP) .................. 2018-231556

(51) Int. Cl.
*G09G 3/20* (2006.01)
*G09G 3/36* (2006.01)
*G02F 1/1334* (2006.01)

(52) U.S. Cl.
CPC ......... *G09G 3/3677* (2013.01); *G02F 1/1334* (2013.01); *G09G 2300/0426* (2013.01)

(58) Field of Classification Search
CPC .......... G09G 3/3677; G09G 2300/0426; G02F 1/1334; G02F 1/1368; G02F 1/136209; G02F 1/136213
USPC .......................................................... 345/55
See application file for complete search history.

(56) References Cited

U.S. PATENT DOCUMENTS

| 5,461,501 A | 10/1995 | Sato et al. |
| 2001/0033346 A1 | 10/2001 | Sato et al. |
| 2002/0130614 A1 | 9/2002 | Huitema et al. |
| 2008/0061394 A1* | 3/2008 | Nakagawa ........ G02F 1/133512 |
| | | 257/435 |
| 2011/0085095 A1 | 4/2011 | Yamauchi |
| 2016/0282684 A1* | 9/2016 | Nakamura .......... H01L 27/1255 |

(Continued)

FOREIGN PATENT DOCUMENTS

| JP | 58-021784 A | 2/1983 |
| JP | 06-194690 A | 7/1994 |

(Continued)

OTHER PUBLICATIONS

Notice of Reasons for Refusal dated Aug. 30, 2022, in corresponding Japanese Application No. 2018-231556, 10 pages.

(Continued)

*Primary Examiner* — Jennifer T Nguyen
(74) *Attorney, Agent, or Firm* — Maier & Maier, PLLC

(57) ABSTRACT

According to one embodiment, a display device includes a first substrate, a second substrate including a common electrode, and a display function layer which is partly switched between a transparent state and a scattering state. The first substrate includes a first scanning line, a first signal line, an insulating layer, a first switching element, and a first pixel electrode. The first signal line includes a first coupling portion and a first line portion. The first scanning line intersects the first coupling portion and is provided in a same layer as the first line portion. The insulating layer is interposed between the first coupling portion and the first scanning line.

17 Claims, 18 Drawing Sheets

(56) References Cited

U.S. PATENT DOCUMENTS

2017/0255072 A1    9/2017   Kaneko et al.
2019/0339556 A1*  11/2019   Yoshida ................ G02F 1/1368

FOREIGN PATENT DOCUMENTS

| JP | 2003-110019 A | 4/2003 |
| JP | 2004-519719 A | 7/2004 |
| JP | 2011-081245 A | 4/2011 |
| JP | 2017-156718 A | 9/2017 |

OTHER PUBLICATIONS

International Search Report dated Jan. 7, 2020 in PCT/JP2019/044443 filed on Nov. 12, 2019, citing documents AB-AD & AP-AT therein, 2 pages.

\* cited by examiner

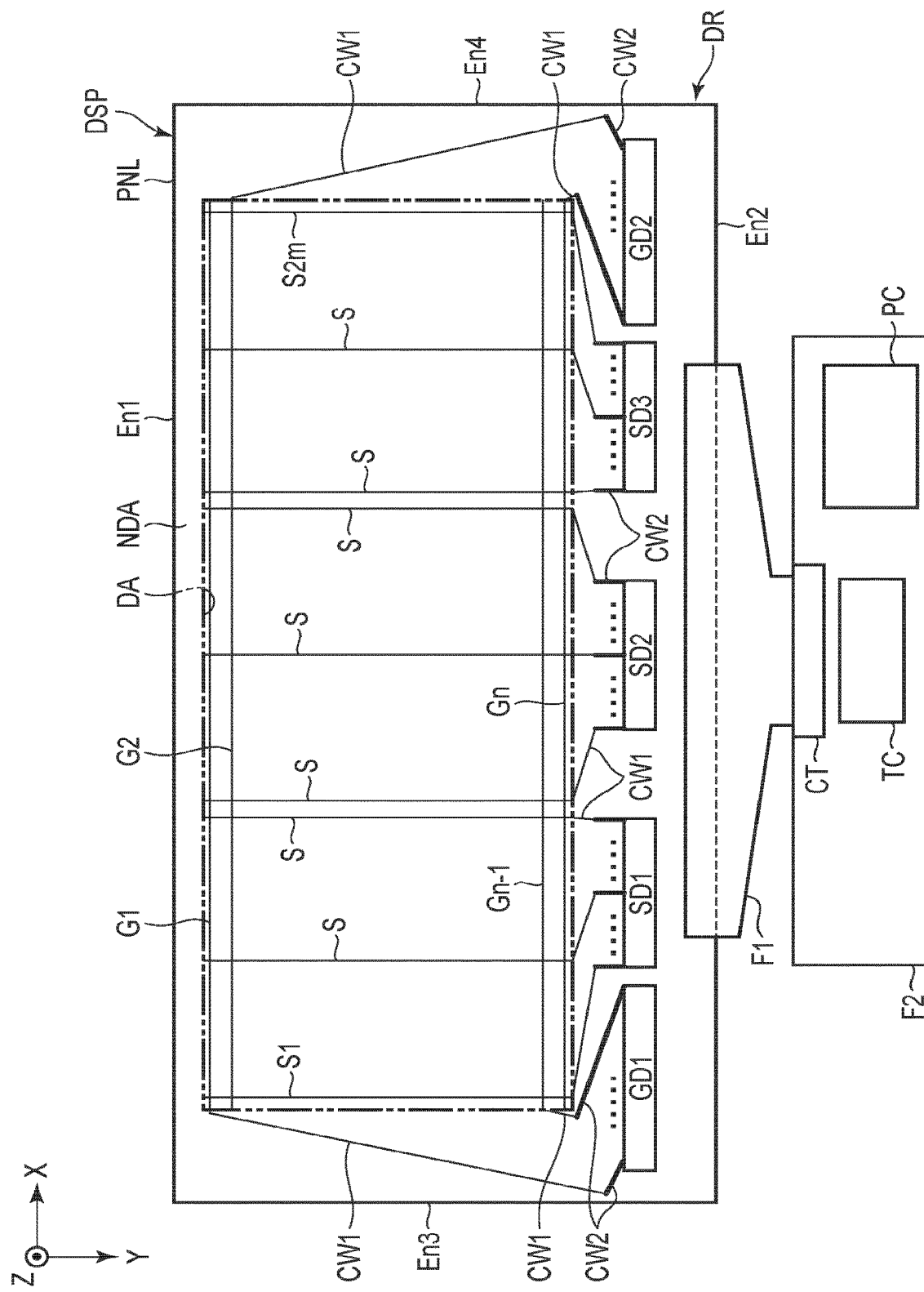
F I G. 1

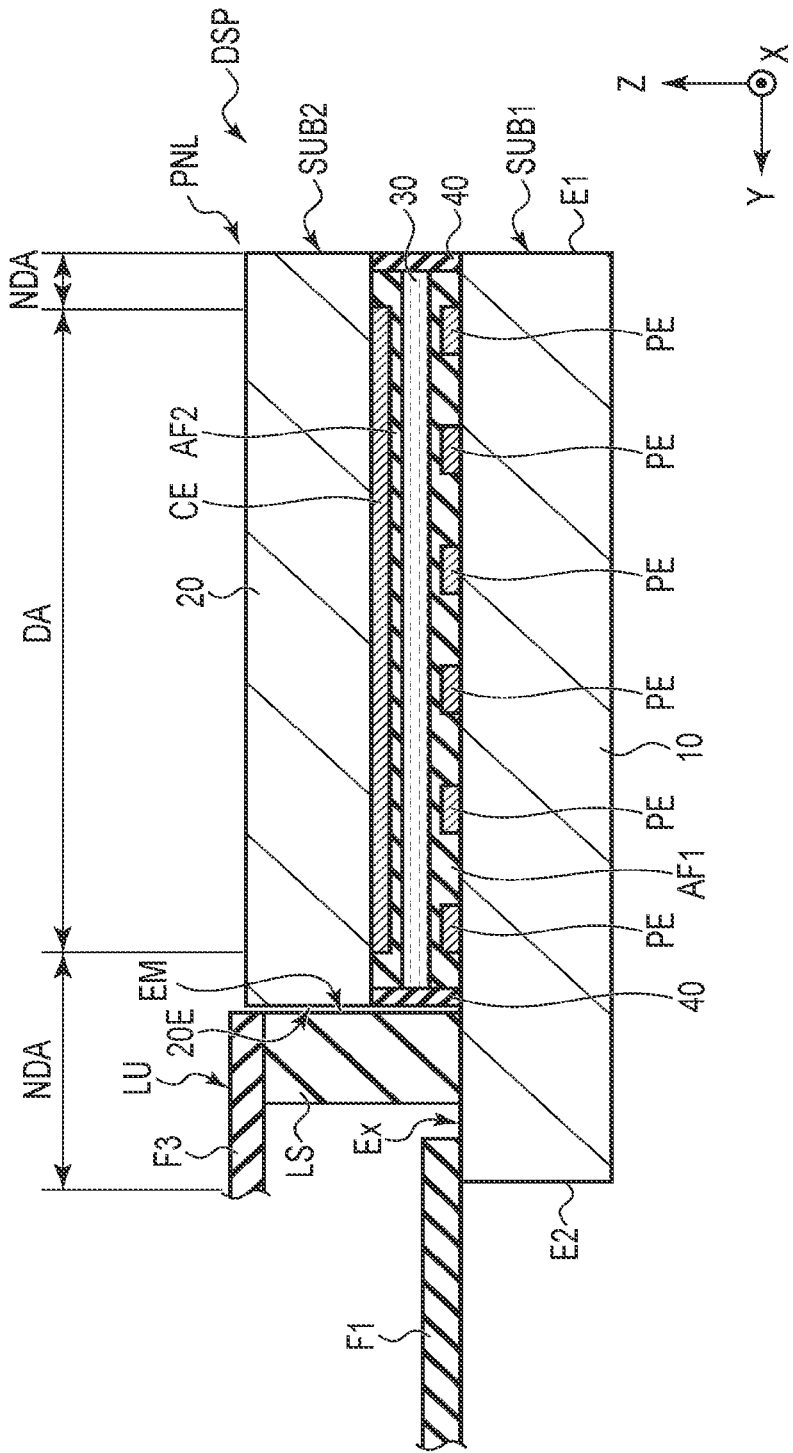
F I G. 2

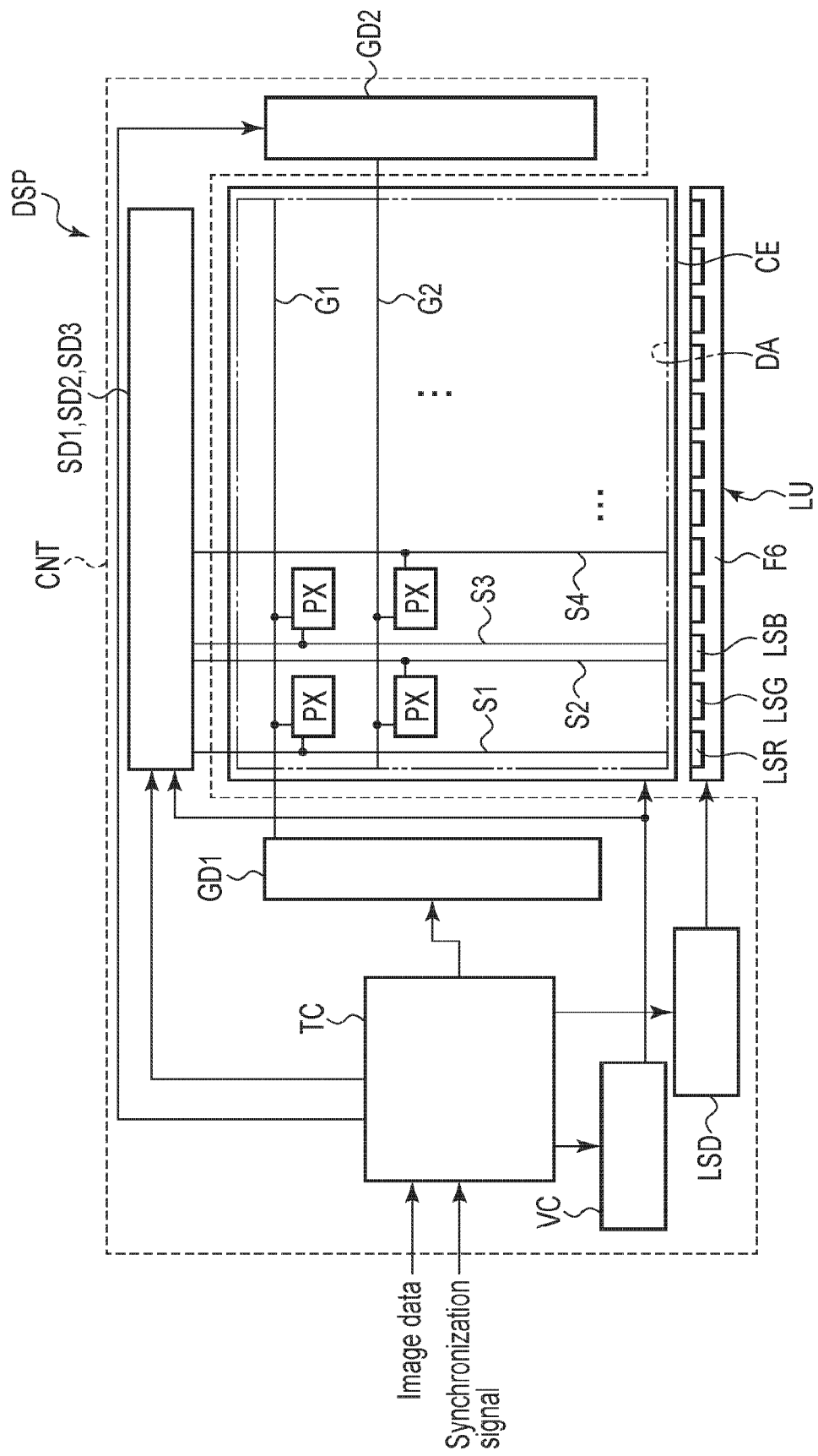
F I G. 3

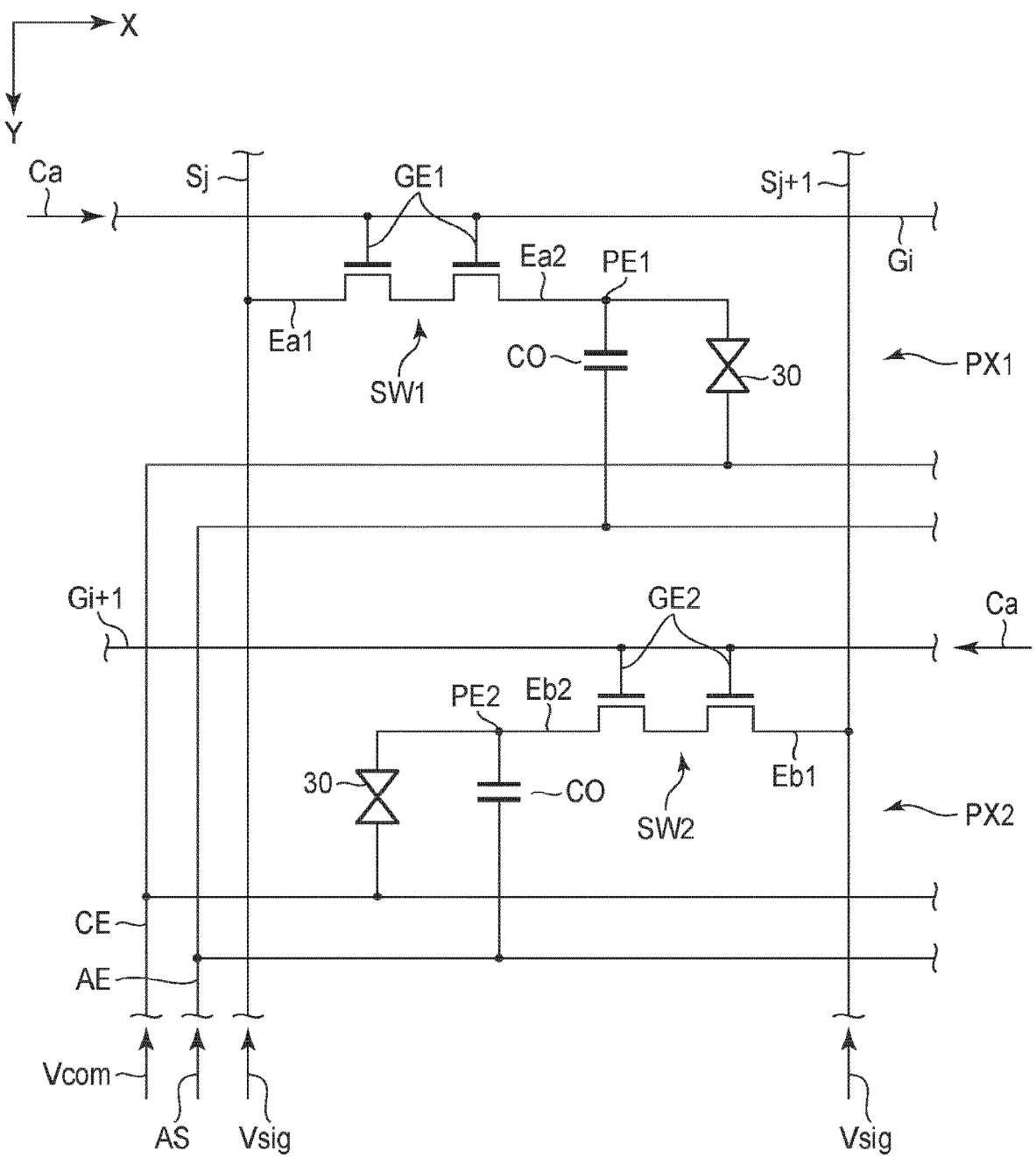
F I G. 4

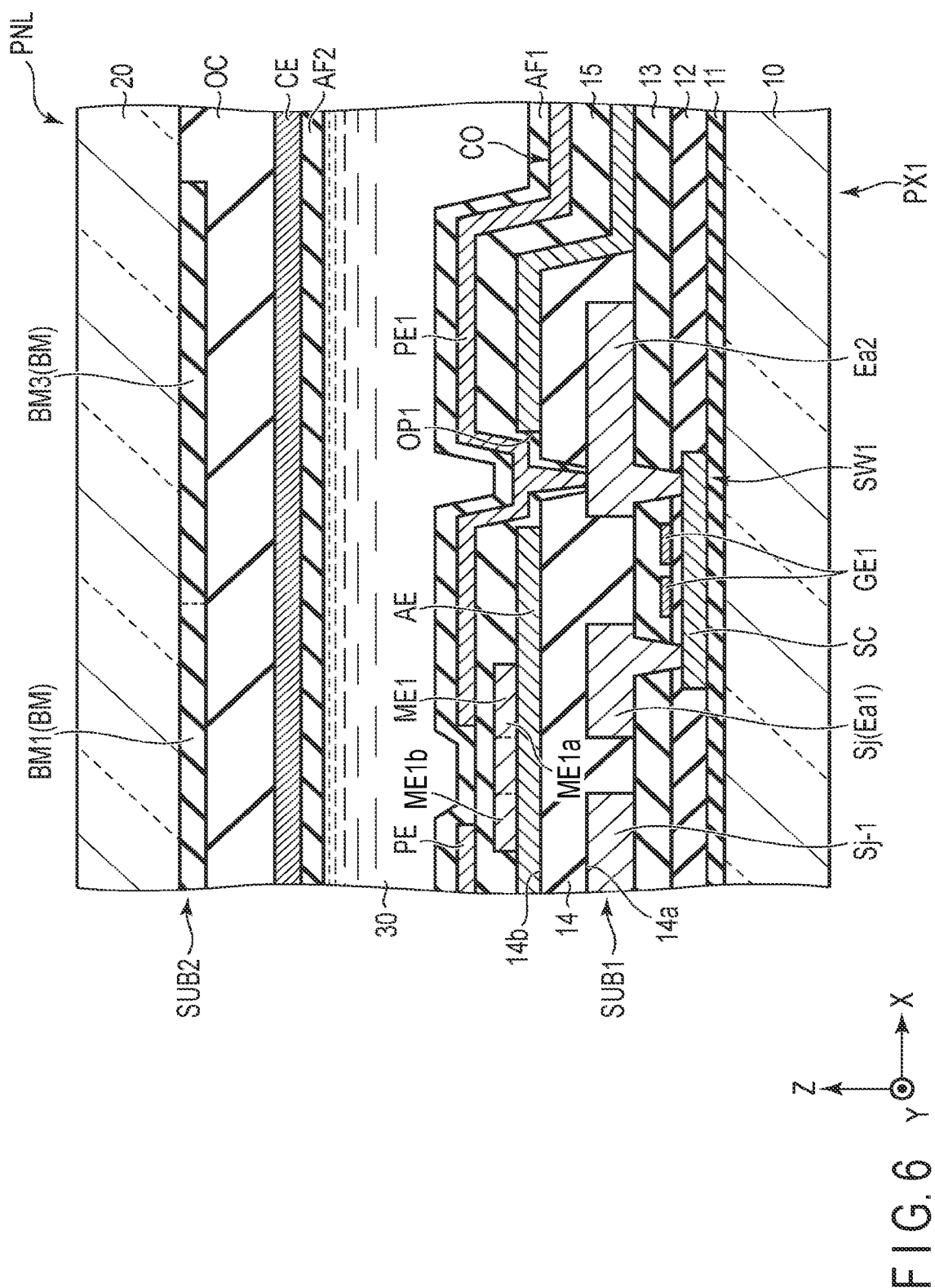
F I G. 6

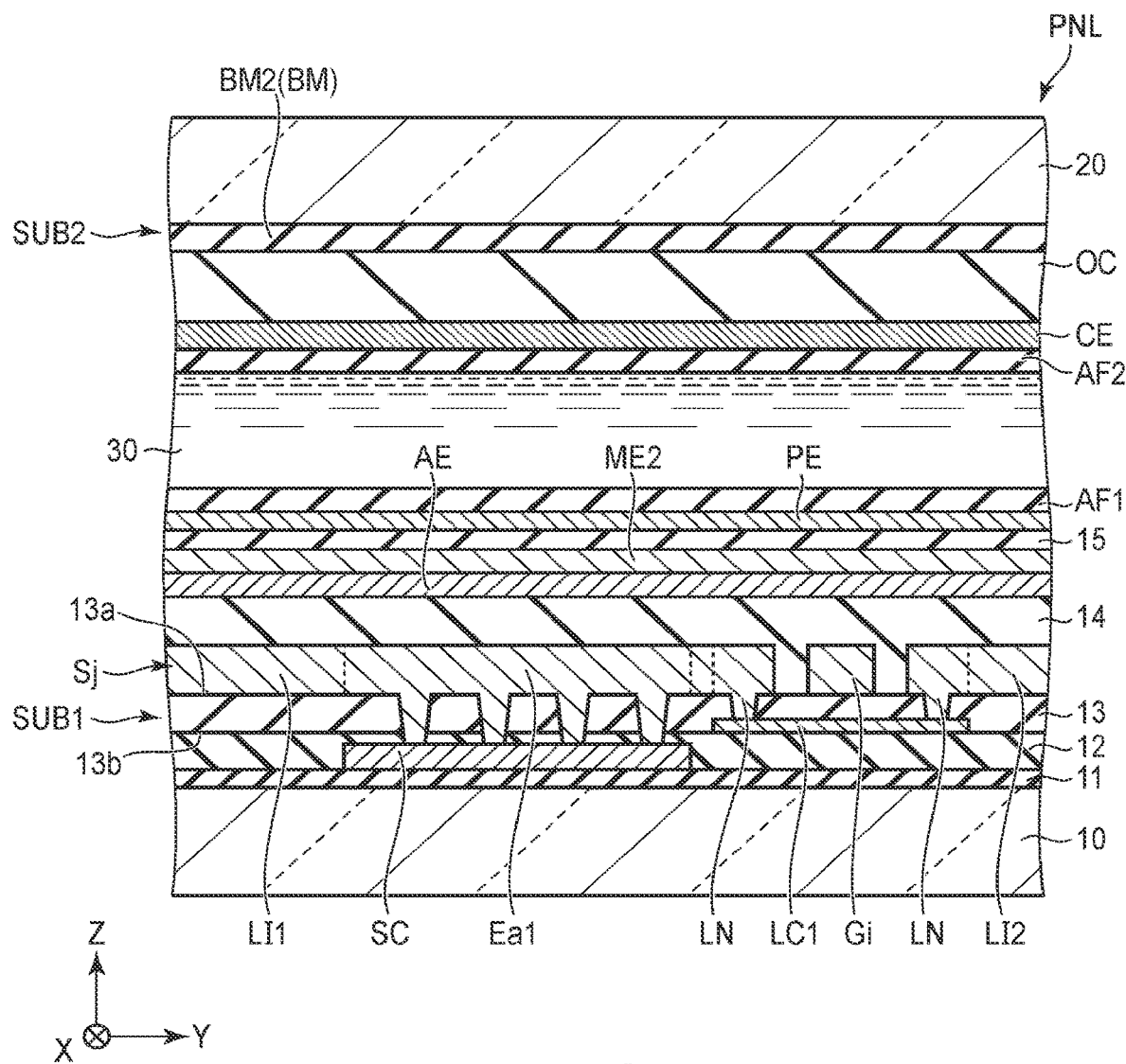
F I G. 7

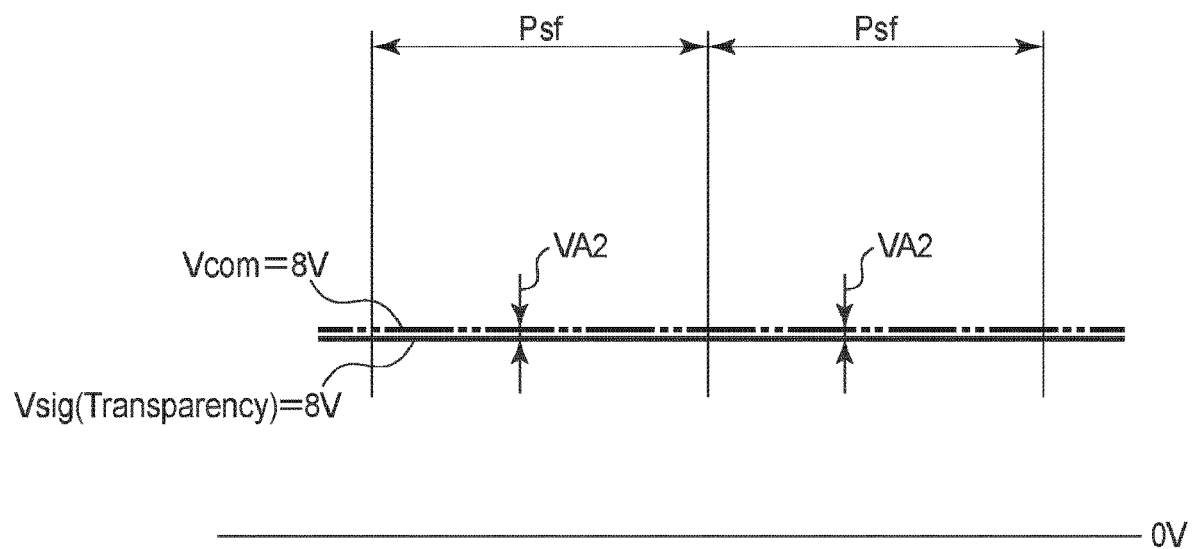
F I G. 14

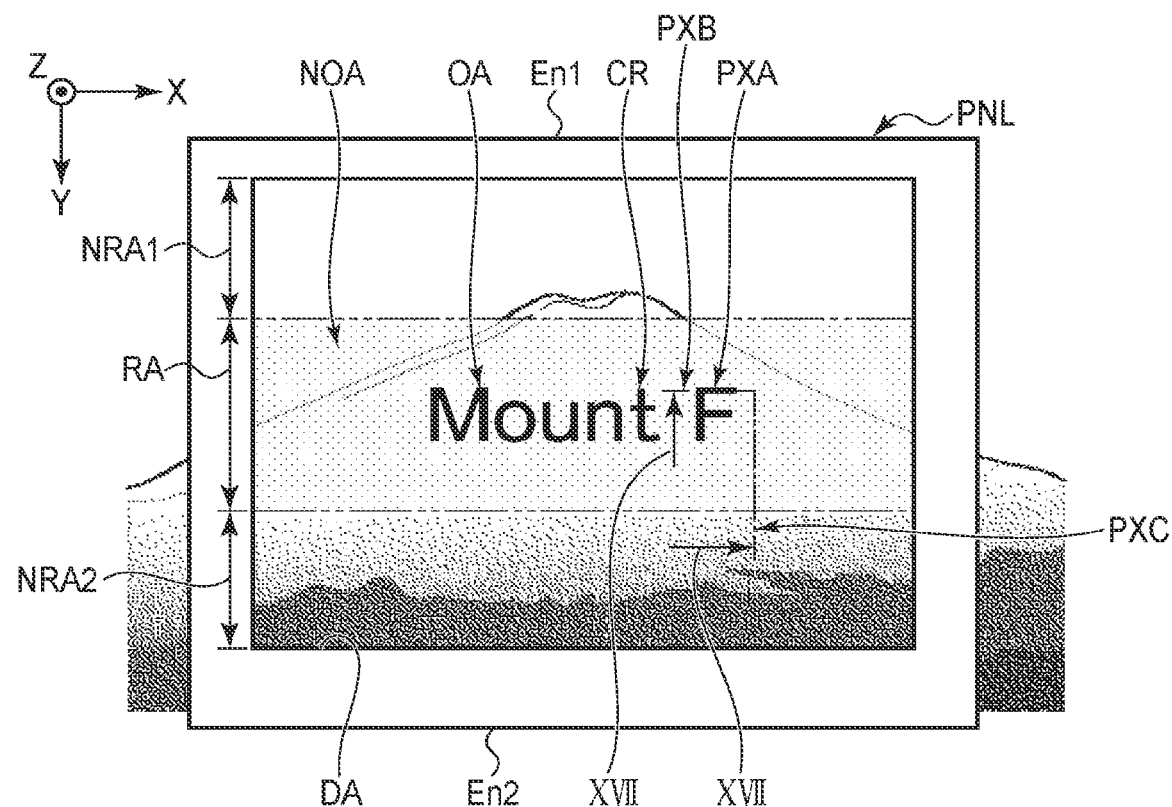
F I G. 16
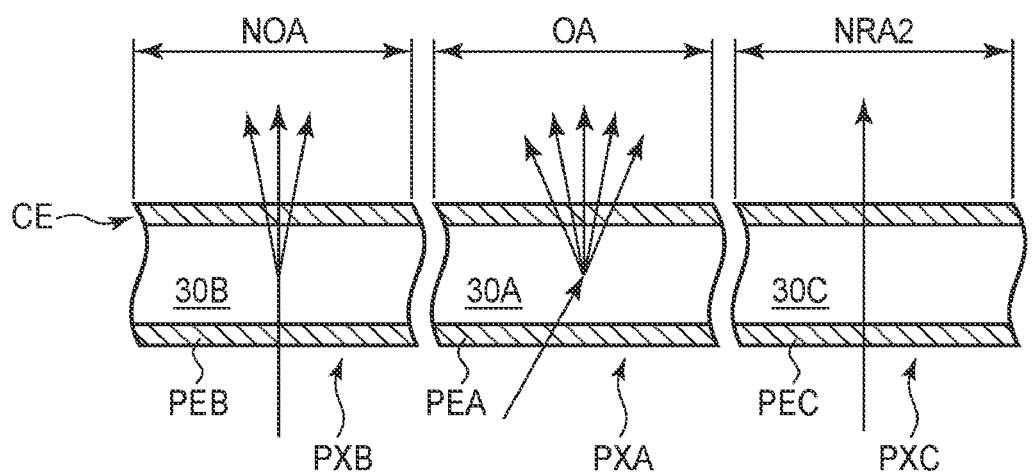
F I G. 17

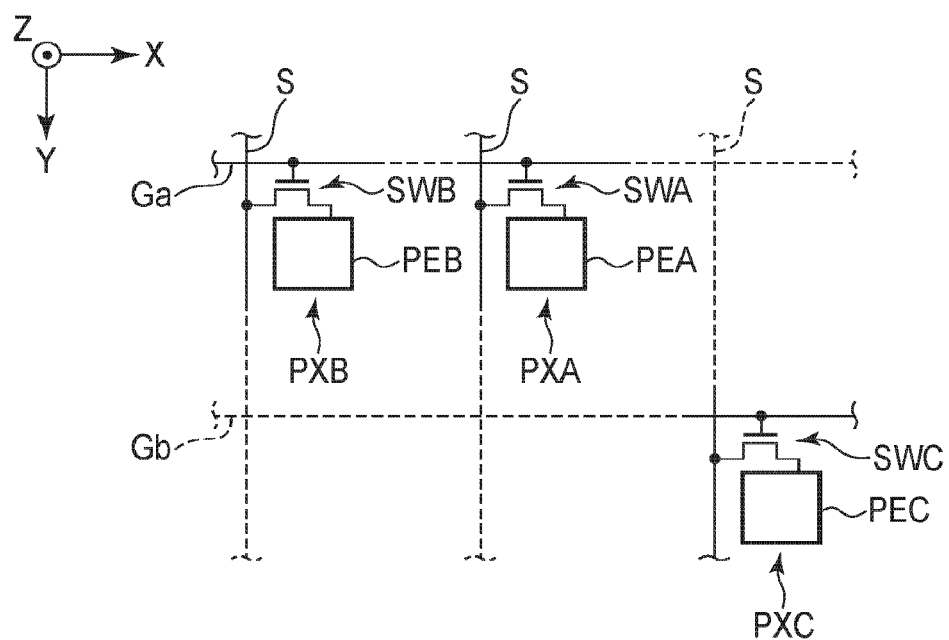
F I G. 18

DISPLAY DEVICE

CROSS-REFERENCE TO RELATED APPLICATIONS

This application is a Continuation Application of PCT Application No. PCT/JP2019/044443, filed Nov. 12, 2019 and based upon and claiming the benefit of priority from Japanese Patent Application No. 2018-231556, filed Dec. 11, 2018, the entire contents of all of which are incorporated herein by reference.

FIELD

Embodiments described herein relate generally to a display device.

BACKGROUND

In recent years, a display device including a liquid crystal display panel using a polymer dispersed liquid crystal (which may be referred to as "PDLC" hereinafter) capable of switching between a diffused state in which incident light is diffused and a transparent state in which incident light is transmitted, has been proposed. Switching the liquid crystal display panel to the diffused state enables the display device to display an image. On the other hand, switching the liquid crystal display panel to the transparent state enables the user to visually identify the background through the liquid crystal display panel.

In this display device, one frame period includes a plurality of sub-frame periods, and multicolor display is achieved by displaying an image while selecting a display color for each of the sub-frame periods.

BRIEF DESCRIPTION OF THE DRAWINGS

FIG. 1 is a plan view showing an example of a configuration of a display device according to a first embodiment.

FIG. 2 is a sectional view showing the display device of FIG. 1.

FIG. 3 is a diagram showing main components of the display device of FIG. 1.

FIG. 4 is an equivalent circuit diagram showing two of a plurality of pixels shown in FIG. 3.

FIG. 6 is a sectional view showing the display panel of FIG. 5 along line VI-VI.

FIG. 7 is a sectional view showing the display panel of FIG. 5 along line VII-VII.

FIG. 14 is a timing chart showing another example of the common voltage and signal line voltage in the transparent driving.

FIG. 16 is a plan view of a display panel showing an example of use of the display device and showing a state in which an image is displayed in a single rewrite area.

FIG. 17 is a sectional view showing the display panel of FIG. 16 along line XVII-XVII.

FIG. 18 is an equivalent circuit diagram showing a plurality of pixels shown in FIG. 17 and showing a relationship in connection among scanning lines, signal lines, switching elements and pixel electrodes.

DETAILED DESCRIPTION

Figure 5:
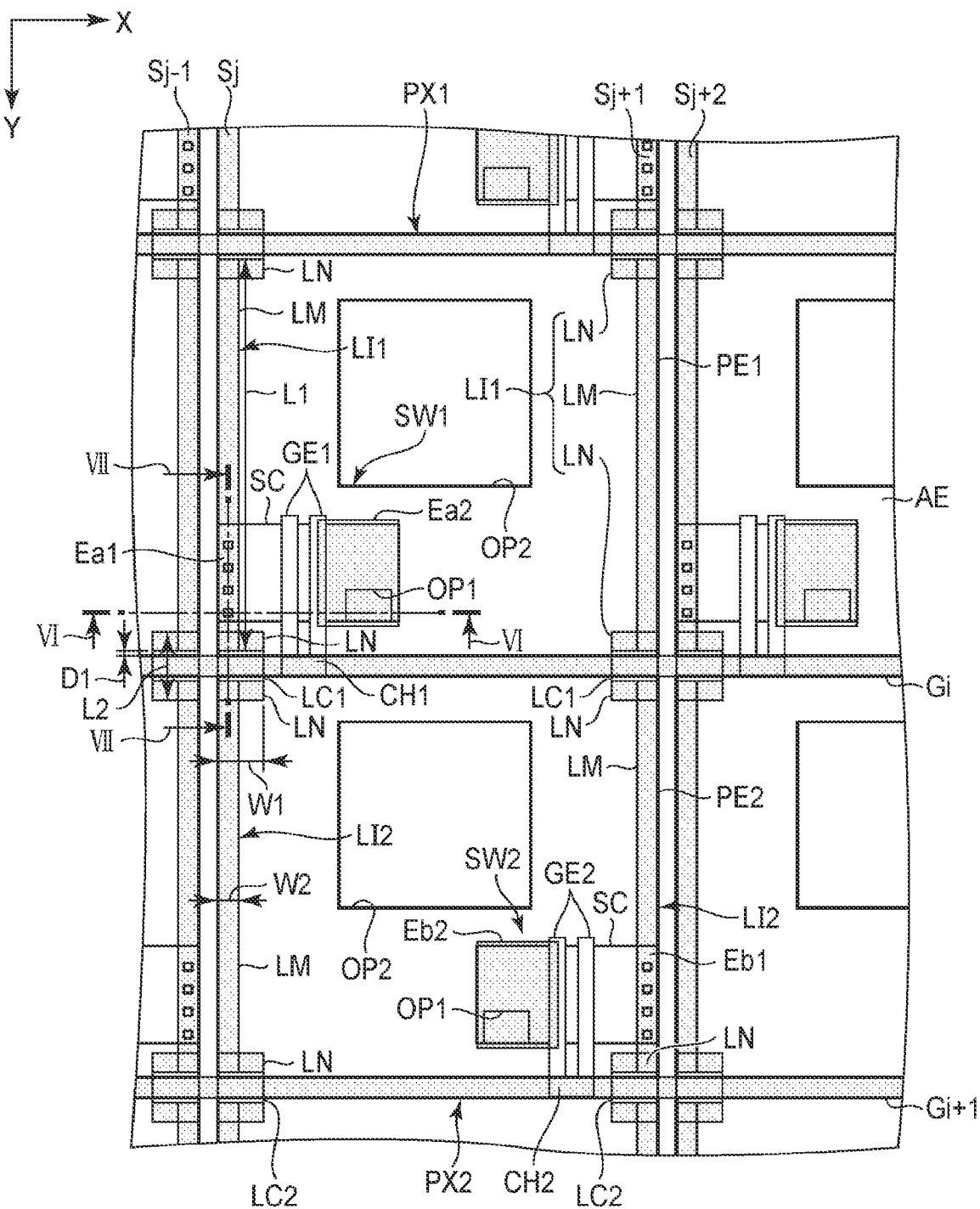
FIG. 5 is a plan view showing part of a display panel of the display device and showing the two pixels.

In general, according to one embodiment, there is provided a display device comprising: a first substrate including a first scanning line extending in a first direction, a first signal line extending in a second direction and intersecting the first scanning line, an insulating layer, a first switching element electrically connected to the first scanning line and the first signal line, and a first pixel electrode electrically connected to the first switching element; a second substrate including a common electrode and disposed opposite to the first substrate; and a display function layer which is held between the first substrate and the second substrate and is partly switched between a transparent state in which incident light is transmitted and a scattering state in which incident light is scattered by applying a voltage between the first pixel electrode and the common electrode, the first signal line including a first coupling portion extending in the second direction and a first line portion extending in the second direction and electrically connected to the first coupling portion, the first scanning line intersecting the first coupling portion and being provided in a same layer as the first line portion, the insulating layer being interposed between the first coupling portion and the first scanning line.

According to another embodiment, there is provided a display device comprising: a first substrate including a first scanning line extending in a first direction, a first signal line extending in a second direction and intersecting the first scanning line, an insulating layer, a first switching element electrically connected to the first scanning line and the first signal line, and a first pixel electrode electrically connected to the first switching element; a second substrate including a common electrode and disposed opposite to the first substrate; and a display function layer which is held between the first substrate and the second substrate and is partly switched between a transparent state in which incident light is transmitted and a scattering state in which incident light is scattered by applying a voltage between the first pixel electrode and the common electrode, the first scanning line including a first coupling portion extending in the first direction and a first line portion extending in the first direction, provided in a same layer as the first signal line, and electrically connected to the first coupling portion; the first signal line intersects the first coupling portion; and the insulating layer is interposed between the first coupling portion and the first signal line.

Embodiments will be described hereinafter with reference to the accompanying drawings. The disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same elements as those described in connection with preceding drawings are denoted by like reference numerals, and a detailed description thereof is omitted unless otherwise necessary.

First Embodiment

First, a first embodiment will be described. In the present embodiment, a liquid crystal display device to which a polymer dispersed liquid crystal is applied will be described as an example of a display device. The display device can be used for various devices such as a smartphone, a tablet terminal and a mobile phone terminal.

FIG. 1 is a plan view showing an example of a configuration of a display device DSP in the first embodiment.

As shown in FIG. 1, a first direction X and a second direction Y intersect each other, and a third direction Z intersect the first and second directions X and Y. The first direction X corresponds to the row direction, and the second direction Y corresponds to the column direction. In the example, the first, second and third directions X, Y and Z are orthogonal to each other, but may intersect each other at an angle other than 90 degrees. In the present specification, the direction of the arrow indicating the third direction Z will be referred to as upward (or simply up), and the direction opposite to the arrow will be referred to as downward (or simply down).

The display device DSP includes a display panel PNL, wiring substrates F1 and F2 and the like. The display panel PNL includes a display area DA for displaying an image and a non-display area NDA other than the display area DA. In the present embodiment, the non-display area NDA surrounds the display area DA and has the shape of a frame.

The display panel PNL includes n scanning lines Gn (G1 to Gn), 2m signal lines S (S1 to S2m) and the like. Note that n and m are both positive integers, and n may be equal to or different from 2m. In the display area DA, the scanning lines G extend in the first direction X and are arranged at intervals in the second direction Y. In other words, the scanning lines G extend in the row direction. In the display area DA, the signal lines S extend in the second direction Y and are arranged at intervals in the first direction X.

The display panel PNL includes a plurality of first connection lines CW1 and a plurality of second connection lines CW2. The first connection lines CW1 are provided in the non-display area NDA and are electrically connected to either one of the scanning and signal lines G and S. The second connection lines CW2 are provided in the non-display area NDA and are connected to the first connection lines CW1 in a one-to-one relationship.

As will be described later with reference to FIGS. 5 and 20, the first connection lines CW1 are light-shielding metal lines formed of the same second metal layer as the scanning and signal lines G and S which include no coupling portion LC, and the second connection lines CW2 are light-shielding metal lines formed of the same first metal layer as the coupling portion LC and the gate electrode GE, and the first and second metal layers are different in resistance value from each other.

The display panel PNL has sides En1 and En2 extending in the first direction X and sides En3 and En4 extending in the second direction Y. In the present embodiment, the sides En1 and En2 are long sides, and the sides En3 and En4 are short sides.

Scanning line driving circuits GD1 and GD2 and signal line driving circuits SD1, SD2 and SD3 are mounted on the non-display area NDA of the display panel PNL. In the present embodiment, the scanning line driving circuit GD1, the signal line driving circuit SD1, the signal line driving circuit SD2 and the signal line driving circuit SD3, and the scanning line driving circuit GD2 are located between the display area DA and the side En2, and are arranged in order in the first direction X. The scanning line driving circuits GD1 and GD2 and the signal line driving circuits SD1, SD2 and SD3 are electrically connected to the second connection lines CW2, respectively.

That is, the second connection lines CW2 are drawn from each of the scanning line driving circuit GD and the signal line driving circuits SD, the drawn second connection lines CW2 are switched to the first connection lines CW1 in the non-display area NDA, and the first connection lines CW1 are drawn to the display area DA.

The wiring substrate F1 is connected to the display panel PNL and the wiring substrate F2. The wiring substrate F1 is electrically connected to the scanning line driving circuits GD1 and GD2 and the signal line driving circuits SD1, SD2 and SD3. The wiring substrate F2 includes a timing controller TC, a power supply circuit PC and the like. The wiring substrate F1 is connected to a connector CT of the wiring substrate F2. Note that the wiring substrates F1 and F2 may be replaced by a single wiring substrate. The scanning line driving circuits GD1 and GD2, signal line driving circuits SD1, SD2 and SD3 and timing controller TC constitute a driver DR of the present embodiment. The driver DR is configured to control driving of each of the scanning lines G, signal lines S, an auxiliary electrode (described later) and a common electrode (described later). For example, the wiring substrate F1 is a flexible printed circuit (FPC), and the wiring substrate F2 is a rigid printed wired board (PCB).

In addition, the scanning line driving circuits GD1 and GD2 and the signal line driving circuits SD1, SD2 and SD3 are, for example, driver ICs, and the scanning line driving circuits GD1 and GD2 and signal line driving circuits SD1, SD2 and SD3 of the driver ICs are not limited to the example of being mounted on the display panel PNL, but may be mounted on the wiring substrate F1 or F2.

In the example shown, the odd-numbered scanning lines G1, . . . G(n−1) from the side En1 are connected to the scanning line driving circuit GD1, and the even-numbered scanning lines G2, . . . Gn are connected to the scanning line driving circuit GD2. However, the relationship in connection between the scanning lines G and the scanning line driving circuits GD1 and GD2 is not limited to the example shown. For example, the scanning line driving circuits GD1 and GD2 may be replaced with a single scanning line driving circuit, and all the scanning lines G may be connected to a single scanning line driving circuit. The relationship in connection between the signal lines S and the signal line driving circuits SD1, SD2 and SD3 is not limited to the example shown, either. The signal line driving circuits SD1, SD2 and SD3 may be replaced with a single signal line driving circuit, and all the signal lines S may be connected to a single signal line driving circuit.

FIG. 2 is a sectional view showing the display device DSP of FIG. 1. Here is a description of only the main part in the section of the display device DSP in the Y-Z plane defined by the second and third directions Y and Z.

As shown in FIG. 2, the display panel PNL includes a first substrate SUB1, a second substrate SUB2, a liquid crystal layer 30 serving as a display function layer, and the like. The first substrate SUB1 includes a transparent substrate 10, pixel electrodes PE, an alignment film AF1 and the like. The second substrate SUB2 includes a transparent substrate 20, a common electrode CE, an alignment film AF2 and the like. The pixel electrode PE and the common electrode CE are formed of a transparent conductive material such as indium tin oxide (ITO) and indium zinc oxide (IZO).

The liquid crystal layer 30 is located at least in the display area DA. The liquid crystal layer 30 includes a polymer dispersed liquid crystal and is located between the alignment films AF1 and AF2. The liquid crystal layer 30 of the present embodiment utilizes a reverse mode polymer dispersed liquid crystal (R-PDLC). The liquid crystal layer 30 maintains the parallelism of light that enters when an applied voltage is low, and scatters light that enters when the applied voltage is high. The first and second substrates SUB1 and SUB2 are bonded by a sealing member 40. The first substrate SUB1 includes an extended portion EX extended in the second direction Y from an end portion 20E of the transparent substrate 20.

The wiring substrate F1 is mounted on the extended portion EX of the first substrate SUB1 and physically fixed to the extended portion EX. Also, the wiring substrate F1 is electrically connected to pads (not shown) of the extended portion EX. The pads are electrically connected to the scanning line driving circuits GD1 and GD2 and the signal line driving circuits SD1, SD2 and SD3.

A light source unit LU is located in the non-display area NDA outside the display area DA. The light source unit LU includes light emitting elements LS, a wiring substrate F3 and the like. The light emitting element LS is connected to the wiring substrate F3 and located on the extended portion EX. The light emitting element LS has a light emitting portion (light emitting surface) EM that faces the end portion 20E. The illumination light emitted from the light emitting portion EM enters the end portion 20E and propagates through the display panel PNL, as will be described later.

FIG. 3 is a diagram showing main components of the display device DSP of FIG. 1.

As shown in FIG. 3, the display device DSP includes a controller CNT, which is indicated by a dashed line in the figure. The controller CNT includes a timing controller TC, scanning line driving circuits GD1 and GD2, signal line driving circuits SD1, SD2 and SD3, a Vcom circuit VC, a light source driver LSD, and the like.

The timing controller TC generates various signals based on image data and synchronization signals which are externally supplied. As one example, the timing controller TC supplies the signal line driving circuits SD1, SD2 and SD3 with image signals (e.g., video signals) generated by performing predetermined signal processing based on the image data. The timing controller TC also supplies each of the scanning line driving circuits GD1 and GD2, the signal line driving circuits SD1, SD2 and SD3, the Vcom circuit VC and the light source driver LSD with a control signal generated based on the synchronization signal. The timing controller TC will be described in detail later.

The display area DA, which is indicated by an alternate long and two short dashes line in the figure, includes a plurality of pixels PX. The pixels PX are arranged in a matrix in the first and second directions X and Y. The number of pixels PX is n×m. Each of the pixels PX is electrically connected to the scanning line G and the signal line S. The pixels PX in odd rows are electrically connected to the odd-numbered signal lines S1, S3, . . . , and the pixels PX in even rows are electrically connected to the even-numbered signal lines S2, S4, . . . .

The common electrode CE is located in the display area DA. The common electrode CE is shared by the pixels PX. The common electrode CE is part of each of the pixels PX. Each of the scanning lines G is supplied with a control signal from the scanning line driving circuit GD1 or GD2. Each of the signal lines S is supplied with an image signal (video signal) from the signal line driving circuit SD1, SD2 or SD3. The common electrode CE is supplied with a common voltage Vcom from the Vcom circuit VC.

In the present embodiment, the signal lines S are connected to the signal line driving circuits SD without using a selector circuit. Thus, the signal line driving circuits SD can supply image signals simultaneously to all the signal lines S. However, unlike in the present embodiment, the signal lines S may be connected to the signal line driving circuits SD via a selector circuit. In this case, the signal lines S are driven in a time division manner and supplied with image signals in a time division manner.

In addition, each of the scanning line driving circuits GD1 and GD2 is not limited to the example of the driver IC, but may be gate built-in circuit formed on the first substrate SUB1, and the selector circuit connected to the signal line driving circuits SD may also be a built-in circuit formed on the first substrate SUB1.

The light source unit LU is configured to irradiate the liquid crystal layer 30 with light. In the present embodiment, the light source unit LU is configured to irradiate the liquid crystal layer 30 with light of color other than an achromatic color. The light source unit LU includes light emitting elements LS of a plurality of colors. For example, the light source unit LU includes a light emitting element (first light emitting element) LSR that irradiates the liquid crystal layer 30 with light of a first color, a light emitting element (second light emitting element) LSG that irradiates the liquid crystal layer 30 with light of a second color, and a light emitting element (third light emitting element) LSB that irradiates the liquid crystal layer 30 with light of a third color. It goes without saying that the first color, second color and third color are different from each other.

In the present embodiment, the first color is red, the second color is green and the third color is blue. The light source driver LSD controls the lighting periods of the light emitting elements LSR, LSG and LSB. As will be described later in detail, in a drive system in which one frame period includes a plurality of sub-frame periods, at least one of the three light emitting elements LSR, LSG and LSB is lit in each sub-frame, and the color of illumination light is selected for each sub-frame.

In addition, the light source unit LU is not limited to the color display including the light emitting elements LS of the first color, second color and third color as described above, but may include only white light emitting elements and may be used for monochrome display.

Next is a description of two of the pixels PX, which are adjacent to each other in the second direction Y. FIG. 4 is an equivalent circuit diagram showing any two pixels PX among the pixels PX shown in FIG. 3. Here is a description of first and second pixels PX1 and PX2 which are adjacent to each other in the second direction Y.

As shown in FIG. 4, the first pixel PX1 includes a first switching element SW1, a first pixel electrode PE1 electrically connected to the first switching element SW1, an auxiliary electrode AE, and a common electrode CE. The second pixel PX2 includes a second switching element SW2, a second pixel electrode PE2 electrically connected to the second switching element SW2, the auxiliary electrode AE, and the common electrode CE. Hereinafter, the scanning line G and the signal line S, which are electrically connected to the first pixel PX1, will be referred to as a first scanning line Gi and a first signal line Sj, respectively. The scanning line G and the signal line S, which are electrically connected to the second pixel PX2, will be referred to as a second scanning line Gi+1 and a second signal line Sj+1, respectively.

The first switching element SW1 is electrically connected to the first scanning line Gi and the first signal line Sj. The second switching element SW2 is electrically connected to the second scanning line Gi+1 and the second signal line Sj+1. In the present embodiment, the first and second switching elements SW1 and SW2 are configured by thin film transistors (TFT). In addition, the first and second switching elements SW1 and SW2 are N-channel and double-gate TFTs, respectively.

The first switching element SW1 includes a gate electrode GE1, a first electrode Ea1 and a second electrode Ea2. The gate electrode GE1 is electrically connected to the first scanning line Gi. The first electrode Ea1 is connected to the signal line Sj. The second electrode Ea2 is electrically connected to the first pixel electrode PE1.

The ON/OFF state of the first switching element SW1 is selected based on a control signal Ca supplied from the scanning line driving circuit GD through the first scanning line Gi. While the first switching element SW1 is turned on, that is, while the TFT constituting the first switching element SW1 is changed into a conductive state, if the signal line driving circuit SD outputs an image signal Vsig to the first signal line Sj, the image signal Vsig is supplied to the first pixel electrode PE1 through the signal line Sj and the first switching element SW1.

The second switching element SW2 includes a gate electrode GE2, a first electrode Eb1 and a second electrode Eb2. The gate electrode GE2 is electrically connected to the second scanning line Gi+1. The first electrode Eb1 is connected to the signal line Sj+1. The second electrode Eb2 is electrically connected to the second pixel electrode PE2.

The ON/OFF state of the second switching element SW2 is selected based on a control signal Ca supplied from the scanning line driving circuit GD through the second scanning line Gi+1. While the second switching element SW2 is turned on, that is, while the TFT constituting the second switching element SW2 is changed into a conductive state, if the signal line driving circuit SD outputs an image signal Vsig to the second signal line Sj+1, the image signal Vsig is supplied to the second pixel electrode PE2 through the signal line Sj+1 and the second switching element SW2.

Although not shown, in a plurality of pixels PX of one column including the first and second pixels PX1 and PX2, the switching elements SW of the odd-numbered pixels PX are connected to the first signal line Sj, and the switching elements SW of the even-numbered pixels PX are connected to the second signal line Sj+1.

The common electrode CE is shared by the pixels PX including the first and second pixels PX1 and PX2. A common voltage Vcom is applied to the common electrode CE from the driver DR. A voltage, which is applied between the first pixel electrode PE1 and the common electrode CE, or a voltage, which is applied between the second pixel electrode PE2 and the common electrode CE, is applied to the liquid crystal layer 30.

The auxiliary electrode AE is shared by the pixels PX including the first and second pixels PX1 and PX2. The auxiliary electrode AE is supplied with an auxiliary signal AS from the driver DR. In the present embodiment, the voltage value of the auxiliary signal AS is the same as the value of the common voltage Vcom. The auxiliary electrode AE is capacitively coupled with each pixel electrode PE. For example, the auxiliary electrode AE and each pixel electrode PE form a capacitor CO.

The first signal line Sj connected to the first pixel PX1 and the second signal line Sj+1 connected to the second pixel PX2 are different from each other. If, therefore, the levels of control signals Ca supplied to the first and second scanning lines Gi and Gi+1 are simultaneously changed to the ON level, the switching elements SW of the pixels PX in two rows including the first and second switching elements SW1 and SW2 can be turned on, and the pixel electrodes PE of the pixels PX in two rows can be supplied with image signals Vsig simultaneously and independently.

FIG. 5 is a plan view of part of the display panel PNL of the display device DSP, illustrating the two first and second pixels PX1 and PX2 shown in FIG. 4. In FIG. 5, a light-shielding layer BM to be described later is not shown.

As shown in FIG. 5, the first scanning line Gi extends in the first direction X. The first signal line Sj extends in the second direction Y and intersects the first scanning line Gi. The second scanning line Gi+1 extends in the first direction X, intersects the first signal line Sj, and is located at a distance from the first scanning line Gi in the second direction Y. The second signal line Sj+1 extends in the second direction Y, intersects the first scanning line Gi and the second scanning line Gi+1, and is located at a distance from the first signal line Sj in the first direction X.

The first signal line Sj includes a plurality of coupling portions LC and a plurality of line portions LI. Each of the line portions LI is located between scanning lines G. For example, the first signal line Sj includes a first coupling portion LC1, a first line portion LI1, a second coupling portion LC2 and a second line portion LI2. The first coupling portion LC1 extends in the second direction Y. The first line portion LI1 extends in the second direction Y and is electrically connected to the first coupling portion LC1. The second coupling portion LC2 extends in the second direction Y. The second line portion LI2 extends in the second direction Y, is located between the first and second scanning lines Gi and Gi+1, and is electrically connected to the first and second coupling portions LC1 and LC2.

Each of the first and second line portions LI1 and LI2 includes a single main line portion LM and two connecting portions LN. The main line portion LM extends in the second direction Y. The connecting portions LN are provided continuously from the main line portion LM, superposed on the coupling portions LC, and electrically connected to the coupling portions LC.

Like the first signal line Sj, the second signal line Sj+1 is configured to include a plurality of coupling portions LC and a plurality of line portions LI. For example, the second signal line Sj+1 includes a first coupling portion LC1, a first line portion LI1, a second coupling portion LC2 and a second line portion LI2. The remaining signal lines S are also configured in the same manner as the first and second signal lines Sj and Sj+1.

The scanning lines G and line portions LI are formed of the same material and are formed of a material other than the material of the coupling portions LC. The electric resistance of each of the scanning lines G and line portions LI is lower than that of each of the coupling portions LC. The scanning lines G, line portions LI and coupling portions LC are formed of a metallic material such as aluminum (Al), titanium (Ti), silver (Ag), molybdenum (Mo), tungsten (W), copper (Cu) and chromium (Cr), an alloy obtained by combining these metallic materials, or the like, and may have a single layer structure or a multilayer structure. In addition, metal portions containing the scanning lines G and line portions LI, which are formed of the same material and on the same insulating film, can be referred to as second conductive layers.

In the present embodiment, the coupling portions LC are formed of molybdenum tungsten (MoW). However, as described above, the coupling portions LC may be formed of another metal such as Mo.

Here, metal portions formed of the same material as the coupling portions LC and on the same insulating film can be referred to as first conductive layers.

In the present embodiment, the scanning lines G and the line portions LI may be formed of TAT. The TAT has a three-layer stacked structure (Ti type/Al type/Ti type) and includes a lower layer formed of Ti or a metallic material containing Ti as a main component, such as an alloy containing Ti, an intermediate layer formed of Al or a metallic material containing Al as a main component, such as an alloy containing Al, and an upper layer formed of Ti or a metallic material containing Ti as a main component, such as an alloy containing Ti. As described above, however, the scanning lines G and the line portions LI may be formed of metal other than TAT such as MAM. The MAM has a three-layer stacked structure (Mo type/Al type/Mo type) and includes a lower layer formed of Mo or a metallic material containing Mo as a main component such as an alloy containing Mo, an intermediate layer formed of Al or a metallic material containing Al as a main component such as an alloy containing Al, and an upper layer formed of Mo or a metallic material containing Mo as a main component such as an alloy containing Mo.

In the second direction Y, the length L1 of the line portion LI is set larger than the length L2 of the coupling portion LC. In the second direction Y, an interval between the first line portion LI1 (line portion LI) and the first scanning line Gi (scanning line G) is defined as DI. Since the length L1 of the line portion LI is preferably larger, the interval DI falls within the range of 0.5 μm to 10 μm, preferably within the range of 1.0 μm to 2.0 μm. This can therefore contribute to a reduction of electric resistance (wiring resistance) of the signal lines S. Note that the numerical value of the interval DI is an example, and may be a value exceeding 10 μm.

In the first direction X, the width W1 of the coupling portion LC is set larger than the width W2 of the main line portion LM. This can contribute to a further reduction of electric resistance (wiring resistance) of the signal lines S.

In the present embodiment, the first connection line CW1 shown in FIG. 1 is formed of the same material as that of the scanning lines G and line portions LI. In the present embodiment, the second connection line CW2 is formed of the same material as that of the coupling portions LC. In addition, the first connection lines CW1 may be formed of the same material as that of the connecting portions LC.

The first scanning line Gi intersects the first coupling portions LC1 of the signal lines S such as the first signal line Sj and the second signal line Sj+1. The second scanning line Gi+1 intersects the second coupling portions LC2 of the signal lines S such as the first signal line Sj and the second signal line Sj+1.

The first switching element SW1 includes a semiconductor layer SC as well as the gate electrode GE1, first electrode Ea1 and second electrode Ea2. In the first switching element SW1, the semiconductor layer SC is electrically connected to the first line portion LI1 of the first signal line Sj. The gate electrode GE1 is opposed to the semiconductor layer SC and electrically connected to the first scanning line Gi. The first electrode Ea1 is opposed to the semiconductor layer SC and connected to the semiconductor layer SC. In the present embodiment, the first electrode Ea1 is formed integrally with the first line portion LI1 of the first signal line Sj. The second electrode Ea2 is opposed to the semiconductor layer SC and connected to the semiconductor layer SC. In the first direction X, the gate electrode GE1 is located substantially between the first and second electrodes Ea1 and Ea2.

The second switching element SW2 includes a semiconductor layer SC as well as the gate electrode GE2, the first electrode Eb1 and the second electrode Eb2. In the second switching element SW2, the semiconductor layer SC is electrically connected to the second line portion LI2 of the second signal line Sj+1. The gate electrode GE2 is opposed to the semiconductor layer SC and electrically connected to the second scanning line Gi+1. The first electrode Eb1 is opposed to the semiconductor layer SC and connected to the semiconductor layer SC. In the present embodiment, the first electrode Eb1 is formed integrally with the second line portion LI1 of the second signal line Sj+1. The second electrode Eb2 is opposed to the semiconductor layer SC and connected to the semiconductor layer SC. In the first direction X, the gate electrode GE2 is located substantially between the first and second electrodes Eb1 and Eb2.

In each switching element SW, the gate electrode GE extends in the second direction Y. The gate electrode GE and the coupling portion LC are formed of the same material. In the present embodiment, the gate electrode GE is formed of MoW. In the second direction Y, the first coupling portion LC1 of the first signal line Sj is located in a region closer to the first scanning line Gi than the semiconductor layer SC of the first switching element SW1. In the second direction Y, the second coupling portion LC2 of the second signal line Sj+1 is located in a region closer to the second scanning line Gi+1 than the semiconductor layer SC of the second switching element SW2.

In each switching element SW, the second electrodes (Ea2, Eb2) are formed of the same material as that of the scanning line G and line portions LI.

The auxiliary electrode AE is provided at least in the entire display area DA and shared by the pixels PX. The auxiliary electrode AE is opposed to the switching elements SW, the scanning lines G and the signal lines S. The auxiliary electrode AE has a plurality of first openings OP1 and a plurality of second openings OP2. The first openings OP1 are opposed to the second electrodes (Ea2, Eb2) of the switching elements SW.

The first openings OP1 are used to connect the switching elements SW and the pixel electrodes PE. The second openings OP2 are formed in a region surrounded by two adjacent scanning lines G and two adjacent signal lines S. The second opening OP2 are provided to adjust the value of capacitance formed between the auxiliary electrode AE and the pixel electrodes PE. The capacitance may be increased by forming the auxiliary electrode AE without using the second openings OP2 and decreasing the size of the second openings OP2. Alternatively, the capacitance may be decreased by increasing the size of the second openings OP2. However, even though the second openings OP2 are increased in size, it is preferable that the auxiliary electrode AE is opposed to the switching elements SW, the scanning lines G and the signal lines S. It is thus possible to shield the scanning lines G and the signal lines S with the auxiliary electrode AE such that their potentials do not affect the pixel electrodes PE.

The first and second pixel electrodes PE1 and PE2 are located between the first and second signal lines Sj and Sj+1. The first scanning line Gi is located between the first and second pixel electrodes PE1 and PE2. In the present embodiment, the pixel electrode PE has a quadrangular shape and is provided substantially in a region surrounded by two adjacent scanning lines G and two adjacent signal lines S. Each of the pixel electrodes PE is opposed to a single first opening OP1 and a single second opening OP2.

Next is a description of a sectional structure of the display panel PNL. FIG. 6 is a sectional view illustrating the display panel PNL of FIG. 5 along line VI-VI.

As shown in FIG. 6, the first substrate SUB1 includes the transparent substrate 10, insulating layers 11, 12, 13, 14 and 15, the first switching element SW1, the signal line S, the auxiliary electrode AE, a metal layer ME1, the pixel electrode PE and the alignment film AF1. As the transparent substrate 10, a glass substrate having insulation properties can be used. However, a substrate other than the glass substrate may be used as the transparent substrate 10. For example, the transparent substrate 10 may be a resin substrate.

The insulating layers 11, 12, 13, 14 and 15 are arranged in order on the transparent substrate 10. The insulating layers 11, 12, 13 and 15 are each formed of an inorganic insulating layer such as silicon oxide and silicon nitride, or a stacked layer body thereof. The insulating layer 14 is formed of an organic insulating layer.

The semiconductor layer SC is located on the insulating layer 11 and covered with the insulating layer 12. The gate electrode GE1 is located on the insulating layer 12, opposed to the semiconductor layer SC and covered with the insulating layer 13. The signal line S and the second electrode Ea2 are located on the insulating layer 13 and covered with the insulating layer 14. The first electrode Ea1 (first signal line Sj) is in contact with the semiconductor layer SC through a contact hole formed in the insulating layers 12 and 13. The second electrode Ea2 is in contact with another region of the semiconductor layer SC through another contact hole formed in the insulating layers 12 and 13.

The insulating layer 14 covers a region where the signal line S and the switching element SW are placed and does not cover a region where the signal line S or the switching element SW is not placed. In other words, the insulating layer 14 is formed in a region of the pixel PX which transmits no light and is not formed in a region thereof which transmits light. It is thus possible to prevent the insulating layer 14 from absorbing light. Since, furthermore, the insulating layer 14 is formed in a portion overlapping the scanning line G and the signal line S in planar view and is not formed in most of the region surrounded by the scanning lines G and the signal lines S, it can also be said that the insulating film 14 is formed in a lattice shape in planar view.

The auxiliary electrode AE is located on the insulating layers 13 and 14. The first opening OP1 of the auxiliary electrode AE is opposed to the second electrode Ea2. The auxiliary electrode AE is formed of a transparent conductive material such as ITO. The metal layer ME1 is located on the auxiliary electrode AE and is in contact with the auxiliary electrode AE. The metal layer ME1 is located between the pixel electrodes PE which are adjacent to each other in the first direction X. The metal layer ME1 faces two signal lines S which are adjacent to each other in the first direction X and extends along the signal lines S. For example, the metal layer ME1 has a stripe shape and extends in the second direction Y. The metal layer ME1 contributes to a reduction in the resistance of stack including the auxiliary electrode AE and the metal layer ME1.

The auxiliary electrode AE and the metal layer ME1 are covered with the insulating layer 15. The pixel electrode PE is located on the insulating layer 15 and covered with the alignment film AF1. The first pixel electrode PE1 is located inside the first opening OP1 and is in contact with the second electrode Ea2 through a contact hole formed in the insulating layers 14 and 15. The auxiliary electrode AE, insulating layer 15 and pixel electrode PE constitute a capacitor CO.

As shown in FIGS. 5 and 6, the first scanning line Gi is in contact with the gate electrode GE1 through a contact hole CH1 formed in the insulating layer 13. The second scanning line Gi+1 is in contact with the gate electrode GE2 through a contact hole CH2 formed in the insulating layer 13.

In addition, the insulating layer 15 is in contact with the insulating layer 14 inside the second opening OP2.

The auxiliary electrode AE and the pixel electrode PE are formed of a light-transmissive conductive material such as ITO.

The second substrate SUB2 includes the transparent substrate 20, the light-shielding layer BM, an overcoat layer OC, the common electrode CE and the alignment film AF2. As the transparent substrate 20, a glass substrate having insulation properties can be used. However, a substrate other than the glass substrate may be used as the transparent substrate 20. For example, the transparent substrate 20 may be a resin substrate.

The light-shielding layer BM and the overcoat layer OC are located on the side of the transparent substrate 20, which faces the first substrate SUB1. The light-shielding layer BM is located between the transparent substrate 20 and the overcoat layer OC. The light-shielding layer BM includes a first light-shielding portion BM1 and a third light-shielding portion BM3. The first light-shielding portion BM1 faces two adjacent signal lines S and the metal layer ME1 and extends along the signal lines S and the metal layer ME1. The third light-shielding portion BM3 faces the switching element SW and is formed integrally with the first light-shielding portion BM1. The overcoat layer OC is formed of a transparent resin. The common electrode CE and the alignment film AF2 are arranged in order on the side of the overcoat layer OC, which faces the first substrate SUB1.

It is likely that the transparency of the display device will be slightly decreased by providing the light-shielding layer BM. The light-shielding layer BM however improves the contrast of display. In order to improve the transparency of the display device, however, the light-shielding layer BM may not be formed on the second substrate SUB2.

The first and second substrates SUB1 and SUB2 are arranged to face the first and second alignment films AF1 and AF2. Although not shown, a spacer is placed between the first and second substrates SUB1 and SUB2. Accordingly, a predetermined cell gap is formed between the first and second alignment films AF1 and AF2. However, the spacer may include not only a main spacer to form a cell gap but also a sub-spacer that is not in contact with one substrate in a steady state where no external stress is applied to the display panel PNL. The cell gap is, for example, 2 μm to 5 μm.

The liquid crystal layer 30 is located between the first and second substrates SUB1 and SUB2 and held between the first and second alignment films AF1 and AF2. The liquid crystal layer 30 constitutes a plurality of pixels PX together with the first and second substrates SUB1 and SUB2.

The liquid crystal layer 30 is so configured that a voltage is applied between the first pixel electrode PE1 and the common electrode CE to partly select a transparent state in which incident light is transmitted or a scattering state in which incident light is scattered. Also, the liquid crystal layer 30 is so configured that a voltage is applied between the second pixel electrode PE2 and the common electrode CE shown in FIG. 5 to partly select a transparent state in which incident light is transmitted or a scattering state in which incident light is scattered.

FIG. 7 is a sectional view of the display panel PNL shown in FIG. 5 along line VII-VII.

As shown in FIG. 7, the first scanning line Gi is provided in the same layer as the first and second line portions LI1 and LI2 of the first signal line Sj. Although not shown, the first scanning line Gi is provided in the same layer as the first and second line portions LI1 and LI2 of each signal line S such as the second signal line Sj+1. In addition, each of the scanning lines G, such as the second scanning line Gi+1, is also provided in the same layer as the first and second line portions LI1 and LI2 of each of the signal lines S, such as the first and second signal lines Sj and Sj+1.

The coupling portion LC such as the first and second coupling portions LC1 and LC2 are provided in the same layer as the gate electrode GE. The insulating layer 13 is interposed between the first coupling portion LC1 and the first scanning line Gi. Note that the insulating layer 13 is interposed between the coupling portion LC and the scanning line G at a plurality of places. For example, the insulating layer 13 is further interposed between the second coupling portion LC2 of the first signal line Sj and the second scanning line Gi+1, between the first coupling portion LC1 of the second signal line Sj+1 and the first scanning line Gi, and between the second coupling portion LC2 of the second signal line Sj+1 and the second scanning line Gi+1 (FIGS. 5 and 7).

The first electrode Ea1 (first signal line Sj) is in contact with the semiconductor layer SC through a contact hole formed in the insulating layers 12 and 13. The connecting portion LN of the line portion LI is in contact with the coupling portion LC through a contact hole formed in the insulating layer 13. For example, the connecting portion LN of the first line portion LI1 of the first signal line Sj is in contact with the first coupling portion LC1 through a contact hole formed in the insulating layer 13. The connecting portion LN of the second line portion LI2 of the first signal line Sj is in contact with the first coupling portion LC1 through a contact hole formed in the insulating layer 13.

The first scanning line Gi, the first line portion LI1 and the second line portion LI2 are in contact with a first surface 13a of the insulating layer 13. A second surface 13b that is the opposite side of the first surface 13a of the insulating layer 13 is in contact with the first coupling portion LC1.

As shown in FIGS. 5 and 7, the insulating layer 14 covers not only a region in which the signal line S and the switching element SW are placed but also a region in which the scanning line G is placed. The width of a region of the insulating layer 14 in the first direction X, which is superposed on two adjacent signal lines S and not superposed on the scanning line G, is larger than the width of a region of the insulating layer 14 in the second direction Y, which is superposed on the scanning line G and not superposed on the signal line S.

The metal layer ME2 is located on the auxiliary electrode AE and is in contact with the auxiliary electrode AE. The metal layer ME2 is located between the pixel electrodes PE which are adjacent to each other in the second direction Y. The metal layer ME2 also faces the scanning line G and extends along the scanning line G. For example, the metal layer ME2 has a stripe shape and extends in the first direction X. In the present embodiment, the width of the metal layer ME2 in the second direction Y is narrower than that of the metal layer ME1 in the first direction X. The metal layer ME2 contributes to a reduction in resistance of stack including the auxiliary electrode AE, metal layer ME1 and metal layer ME. The metal layer ME2 is covered with the insulating layer 15. The metal layer (metal line) ME1 extending in the second direction Y in parallel with the signal line S and the metal layer (metal line) ME2 extending in the first direction X in parallel with the scanning line G are connected to each other, and can be formed in a lattice shape like the insulating layer 14 in planar view. Furthermore, the metal layer ME1 or ME2 may be formed on the insulating layer 14, which changes its line width and covers the switching element SW, so that the insulating layer 14 is formed on a portion covering the switching element SW. The metal layers ME1 and ME2 are not always formed on the top surface (second surface 14b) of the insulating layer 14, but may be formed on the side surface of the insulating layer 14.

The light-shielding layer BM further includes a second light-shielding portion BM2. The second light-shielding portion BM2 faces the scanning line G and the metal layer ME2 and extends along the scanning line G and the metal layer ME2. The second light-shielding portion BM2 is formed integrally with the first light-shielding portion BM1 and the third light-shielding portion BM3 (FIGS. 6 and 7).

Figure 8A:
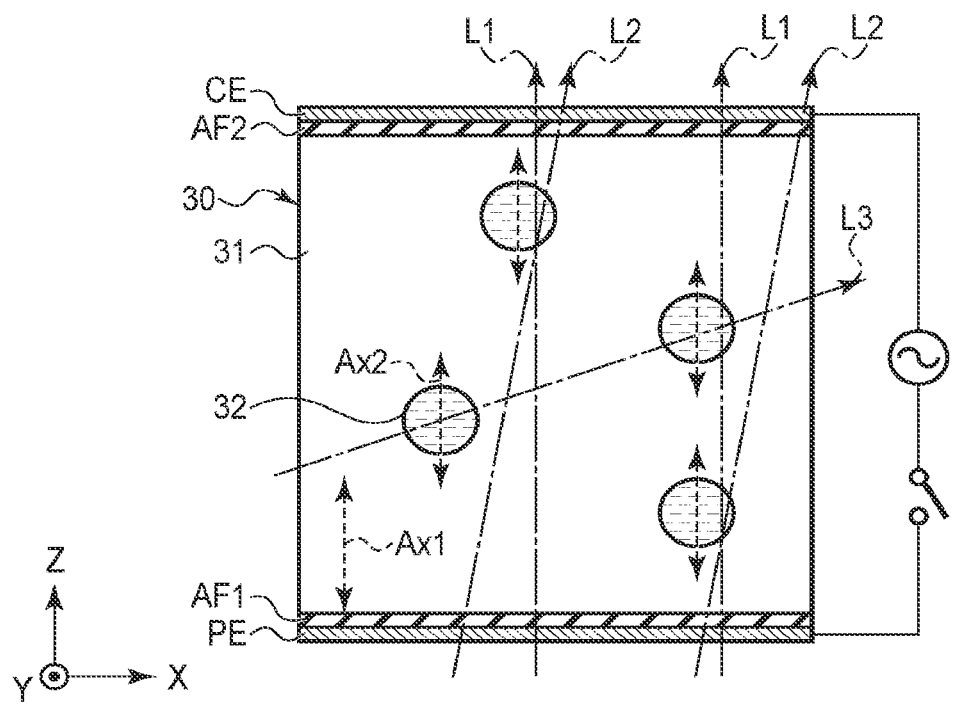
FIG. 8A is a schematic view showing a liquid crystal layer in a transparent state.

Below is a description of a configuration example of a display device including a liquid crystal layer 30 that is a polymer dispersed liquid crystal layer. FIG. 8A is a schematic diagram of the liquid crystal layer 30 in a transparent state.

As shown in FIG. 8A, the liquid crystal layer 30 includes a liquid crystal polymer 31 and liquid crystal molecules 32. The liquid crystal polymer 31 is obtained, for example, by polymerizing a liquid crystal monomer in a state where the liquid crystal monomer is aligned in a predetermined direction by alignment restriction force of the alignment films AF1 and AF2. The liquid crystal molecules 32 are dispersed in the liquid crystal monomer and are aligned in a predetermined direction depending on the alignment direction of the liquid crystal monomer when the liquid crystal monomer is polymerized. The alignment films AF1 and AF2 may be horizontal alignment films that align the liquid crystal monomer and the liquid crystal molecule 32 along the X-Y plane defined by the first and second directions X and Y, or may be vertical alignment films that align the liquid crystal monomer and the liquid crystal molecules 32 along the third direction Z.

The liquid crystal molecule 32 may be a positive type having positive dielectric anisotropy or a negative type having negative dielectric anisotropy. The liquid crystal polymer 31 and the liquid crystal molecules 32 have the same optical anisotropy. Alternatively, the liquid crystal polymer 31 and the liquid crystal molecules 32 have substantially the same refractive anisotropy. That is, the liquid crystal polymer 31 and the liquid crystal molecules 32 each have an ordinary refractive index and an extraordinary refractive index which are substantially equal to each other. Note that the respective values of the liquid crystal polymer 31 and liquid crystal molecules 32 need not completely coincide with each other for both the ordinary refractive index and extraordinary refractive index, and a deviation due to manufacturing errors and the like is allowed. In addition, the liquid crystal polymer 31 and the liquid crystal molecules 32 are different from each other in responsiveness to an electric field. That is, the responsiveness of the liquid crystal polymer 31 to an electric field is lower than that of the liquid crystal molecules 32 to an electric field.

The example shown in FIG. 8A corresponds to, for example, a state in which no voltage is applied to the liquid crystal layer 30 (a potential difference between the pixel electrode PE and the common electrode CE is zero) or a state in which a second transparent voltage to be described later is applied to the liquid crystal layer 30.

As shown in FIG. 8A, the optical axis Ax1 of the liquid crystal polymer 31 and the optical axis Ax2 of the liquid crystal molecule 32 are parallel to each other. In the example shown, the optical axes Ax1 and Ax2 are both parallel to the third direction Z. The optical axis here corresponds to a line that is parallel to the travel direction of a light beam such that the refractive index has one value regardless of the polarization direction.

As described above, the liquid crystal polymer 31 and the liquid crystal molecule 32 have substantially the same refractive anisotropy and the optical axes Ax1 and Ax2 are parallel to each other. Thus, there is almost no difference in refractive index between the liquid crystal polymer 31 and the liquid crystal molecule 32 in all directions including the first, second and third directions X, Y and Z. Therefore, the light L1 incident on the liquid crystal layer 30 in the third direction Z is transmitted without being substantially scattered in the liquid crystal layer 30. The liquid crystal layer 30 can maintain the parallelism of the light L1. Similarly, light L2 and light L3 incident in a direction inclined to the third direction Z is hardly scattered in the liquid crystal layer 30. High transparency is thus obtained. The state shown in FIG. 8A will be referred to as a "transparent state".

Figure 8B:
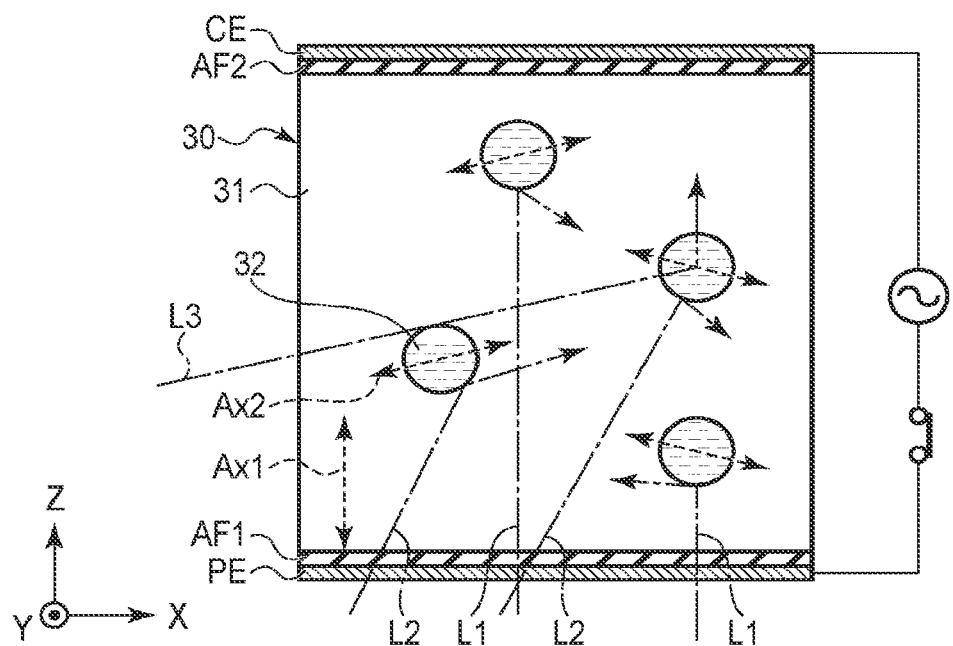
FIG. 8B is a schematic view showing a liquid crystal layer in a scattering state.

FIG. 8B is a schematic diagram of the liquid crystal layer 30 in a scattered state.

As shown in FIG. 8B, as described above, the responsiveness of the liquid crystal polymer 31 to an electric field is lower than that of the liquid crystal molecule 32 to an electric field. For this reason, when a voltage (scattering voltage to be described later) which is higher than each of the foregoing second transparent voltage and a first transparent voltage to be described later is applied to the liquid crystal layer 30, the alignment direction of the liquid crystal polymer 31 hardly changes, but the alignment direction of the liquid crystal molecules 32 changes with an electric field. That is, as shown in the figure, the optical axis Ax1 is almost parallel to the third direction Z, but the optical axis Ax2 is inclined to the third direction Z. The optical axes Ax1 and Ax2 thus cross each other. In all directions including the first, second and third directions X, Y and Z, a large difference in refractive index occurs between the liquid crystal polymer 31 and the liquid crystal molecule 32. Accordingly, the light L1, light L2, and light L3 incident on the liquid crystal layer 30 is scattered in the liquid crystal layer 30. The state shown in FIG. 8B will be referred to as a "scattering state".

The driver DR switches the liquid crystal layer 30 to at least one of the transparent state and scattering state.

Figure 9A:
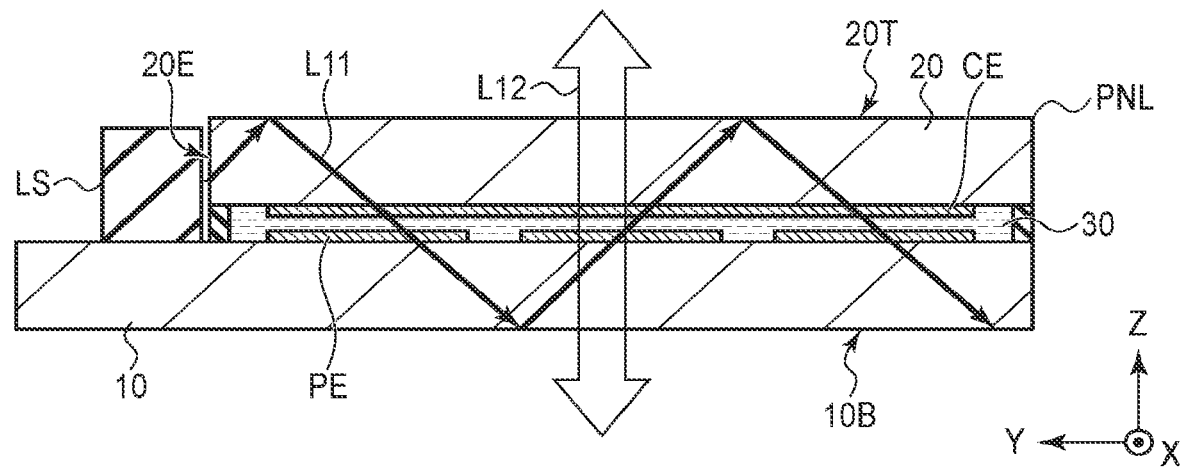
FIG. 9A is a sectional view showing a display panel when the liquid crystal layer is in a transparent state.

FIG. 9A is a sectional view of the display panel PNL when the liquid crystal layer 30 is in a transparent state.

As shown in FIG. 9A, illumination light L11 emitted from the light emitting element LS enters the display panel PNL from the end portion 20E and propagates through the transparent substrate 20, liquid crystal layer 30, transparent substrate 10 and the like. When the liquid crystal layer 30 is transparent, the illumination light L11 is hardly scattered in the liquid crystal layer 30 and thus it hardly leaks from the undersurface 10B of the transparent substrate 10 and the top surface 20T of the transparent substrate 20.

External light L12 that enters the display panel PNL is transmitted almost without being scattered in the liquid crystal layer 30. That is, external light that enters the display panel PNL from the undersurface 10B is transmitted to the top surface 20T, and external light that enters it from the top surface 20T is transmitted to the undersurface 10B. Therefore, when a user observes the display panel PNL from the top surface 20T side, he or she can visually recognize the background in the undersurface 10B side through the display panel PNL. Similarly, when a user observes the display panel PNL from the undersurface 10B, he or she can visually recognize the background in the top surface 20T side through the display panel PNL.

Figure 9B:
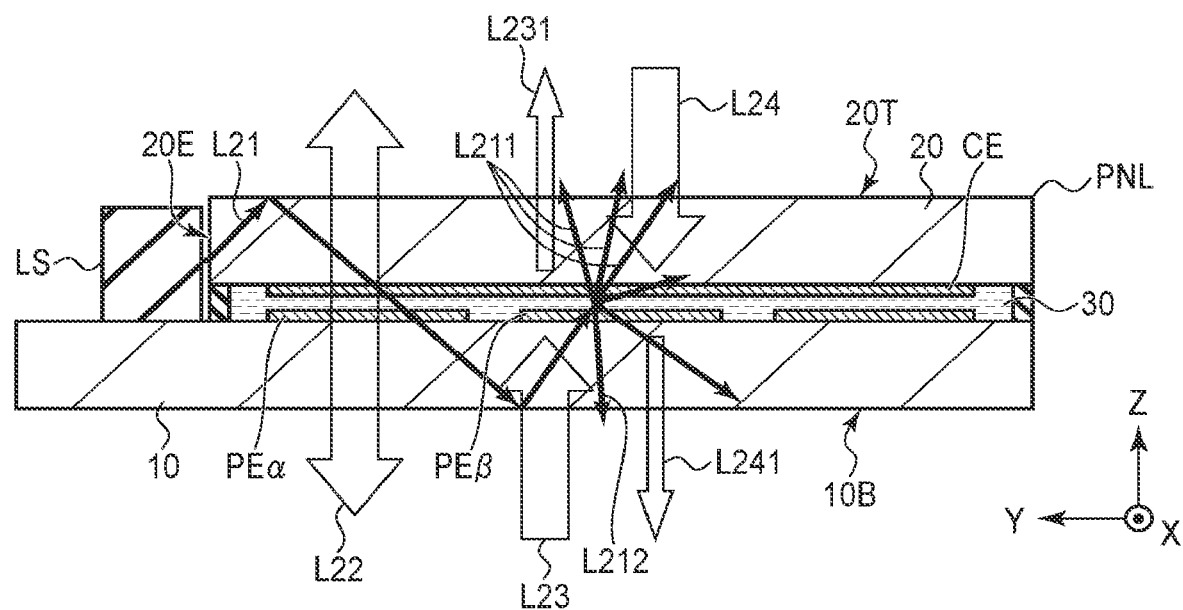
FIG. 9B is a sectional view showing a display panel when the liquid crystal layer is in a scattering state.

FIG. 9B is a sectional view of the display panel PNL where the liquid crystal layer 30 is in a scattering state.

As shown in FIG. 9B, illumination light L21 emitted from the light emitting element LS enters the display panel PNL from the end portion 20E and propagates through the transparent substrate 20, the liquid crystal layer 30, the transparent substrate 10 and the like. In the example illustrated, the liquid crystal layer 30 between a pixel electrode PEα and the common electrode CE (a liquid crystal layer to which a voltage to be applied between the pixel electrode PEα and the common electrode CE is applied) is in a transparent state, and thus the illumination light L21 is hardly scattered in a region of the liquid crystal layer 30 which faces the pixel electrode PEα. On the other hand, the liquid crystal layer 30 between a pixel electrode PEβ and the common electrode CE (a liquid crystal layer to which a voltage to be applied between the pixel electrode PEβ and the common electrode CE is applied) is in a scattering state, and thus the illumination light L21 is scattered in a region of the liquid crystal layer 30 which faces the pixel electrode PER. Scattered light L211 of the illumination light L21 is emitted to the outside from the top surface 20T, and part of the scattered light L212 is emitted to the outside from the undersurface 10B.

Like the external light L12 shown in FIG. 9A, the external light L22 that enters the display panel PNL is transmitted almost without being scattered in the liquid crystal layer 30 at a position overlapping the pixel electrode PEα. At a position overlapping the pixel electrode PEP, light L231 of the external light L23 that enters from the undersurface 10B is scattered in the liquid crystal layer 30 and then transmitted from the top surface 20T. In addition, light L241 of the external light L24 that enters from the top surface 20T is scattered in the liquid crystal layer 30 and then transmitted from the undersurface 10B.

Therefore, when the display panel PNL is observed from the top surface 20T, the color of the illumination light L21 can be visually recognized at a position overlapping the pixel electrode PEβ. Since the external light L231 is transmitted through the display panel PNL, the background in the undersurface 10B side can be visually recognized through the display panel PNL. Similarly, when the display panel PNL is observed from the undersurface 10B, the color of the illumination light L21 can be visually recognized at a position overlapping the pixel electrode PEβ. Since light L241 is transmitted through the display panel PNL, the background in the top surface 20T side can be visually recognized through the display panel PNL. Since the liquid crystal layer 30 is in a transparent state at a position overlapping the pixel electrode PEα, the color of the illumination light L21 is hardly visible, and the background can be visually recognized through the display panel PNL.

Figure 10:
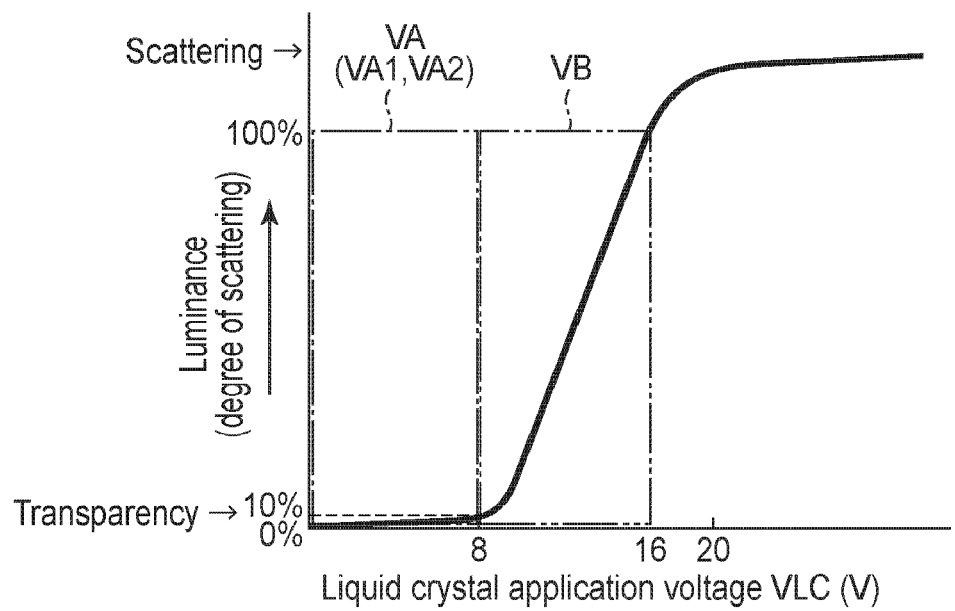
FIG. 10 is a graph showing scattering characteristics of the liquid crystal layer.

FIG. 10 is a graph of scattering characteristics of the liquid crystal layer 30, showing the relationship between a voltage VLC applied to the liquid crystal layer 30 and luminance. The luminance here corresponds to the luminance of the scattered light L211 obtained when the illumination light L21 emitted from the light emitting element LS is scattered in the liquid crystal layer 30 as shown in FIG. 9B, for example. From another point of view, this luminance represents the degree of scattering of the liquid crystal layer 30.

As shown in FIG. 10, when the voltage VLC is increased from 0 V, the luminance increases steeply from about 8 V and saturates at about 20 V. Note that the luminance slightly increases even when the voltage VLC is between 0 V and 8 V. In the present embodiment, a voltage in a range of 8 V to 16 V, which is surrounded by an alternate long and two short dashes line, is used for the gradation expression (e.g., 256 gradations) of each pixel PX. Hereinafter, a voltage of 8 V<VLC≤16 V will be referred to as a "scattering voltage". In the present embodiment, a voltage of 0 V≤VLC≤8 V in a region surrounded by an alternate long and short dash line will be referred to as a "transparent voltage". The transparent voltage VA includes a first transparent voltage VA1 as described above and second transparent voltage VA2.

Note that the numerical values such as voltage values described in the present specification are examples. Therefore, it is not to be denied that the voltage values falls outside the range described in the present specification. For example, the lower limit value and the upper limit value of each of scattering voltage VB and transparent voltage VA are not limited to the examples, but may be determined appropriately according to the scattering characteristics of the liquid crystal layer 30. Unlike in the present embodiment, for example, a voltage of 0 V≤VLC≤10 V may be referred to as a "transparent voltage" and a voltage of 10 V<VLC≤20 V may be referred to as a "scattering voltage".

Assume here that the highest degree of scattering of light that enters the liquid crystal layer 30 when a scattering voltage VB is applied to the liquid crystal layer 30 is 100%. Here, the degree of scattering when a scattering voltage VB of 16 V is applied to the liquid crystal layer 30 is set to 100%. For example, the transparent voltage VA can be defined as a range of voltage VLC whose scattering degree (luminance) is smaller than 10%. Alternatively, the transparent voltage VA can be defined as a voltage VLC that is equal to or lower than a voltage (8 V in the example of FIG. 10) corresponding to the lowest gradation.

In addition, the transparent voltage VA (first transparent voltage VA1 and second transparent voltage VA2) may be different from the example shown in FIG. 10. For example, the first transparent voltage VA1 may be a voltage whose scattering degree is 10% or more and 50% or less. The second transparent voltage VA2 may be a voltage whose scattering degree is less than 10%.

Note that the graph shown in FIG. 10 is applicable to the case where the polarity of a voltage applied to the liquid crystal layer 30 is positive (+) and the case where it is negative (−). In the latter case, the voltage VLC is the absolute value of the negative voltage.

Figure 11:
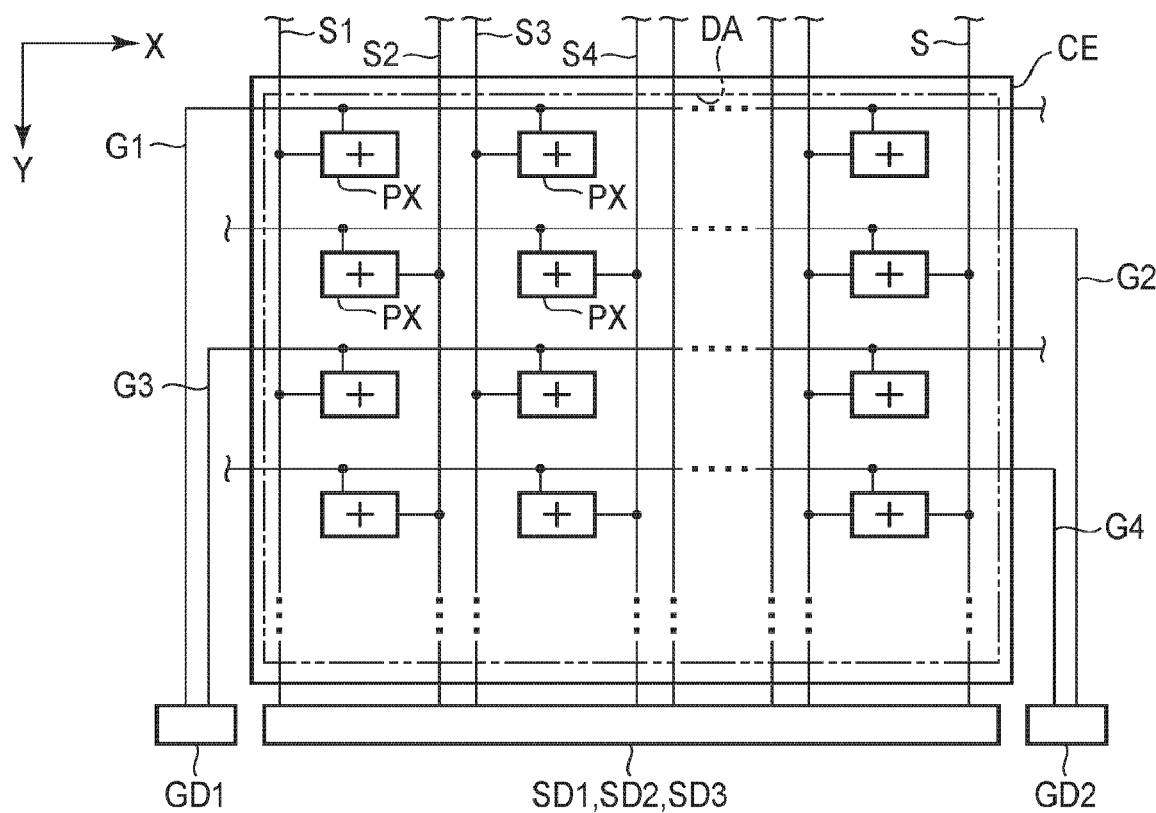
FIG. 11 is a diagram showing an outline of a frame-inversion drive scheme.

Polarity inversion driving for inverting the polarity of a voltage applied to the liquid crystal layer 30 can be applied to the display device DSP. FIG. 11 is a schematic diagram of the polarity inversion driving. A driving method in which a one-frame period includes a plurality of subframe periods (a plurality of field periods) is applied to the display device DSP. This driving method is called, for example, a field sequential system.

As shown in FIG. 11, in a subframe inversion driving method, for example, the polarity of a common voltage and the polarity of a video signal are inverted with a positive polarity (+) and a negative polarity (−) for each subframe period. In the same subframe period, the polarity of a common voltage and the polarity of a video signal are, for example, opposite to each other.

As shown in FIGS. 4 and 11, in the driving method, for example, the polarity of a common voltage Vcom supplied to the common electrode CE and the polarity of an image signal Vsig supplied to the signal lines S from the signal line driving circuits SD1, SD2 and SD3 are inverted for each subframe period in which the scanning line driving circuits GD1 and GD2 supply a control signal Ca to the scanning line G. In the same subframe period, the polarity of the common voltage Vcom and the polarity of the image signal Vsig are, for example, opposite.

The driver DR may perform other polarity inversion driving as well as subframe inversion driving. For example, the driver DR may perform frame inversion driving. The frame inversion driving is driving for inverting a voltage applied to the liquid crystal layer 30 with a positive polarity (+) and a negative polarity (−) for each frame period in which an image is displayed in accordance with one item of image data. Alternatively, the driver DR may perform, for example, two-line inversion driving in which a voltage applied to the liquid crystal layer 30 is inverted with a positive polarity and a negative polarity for every two lines.

Next is a description of the relationship between the image signal Vsig and the common voltage Vcom.

Figure 12:
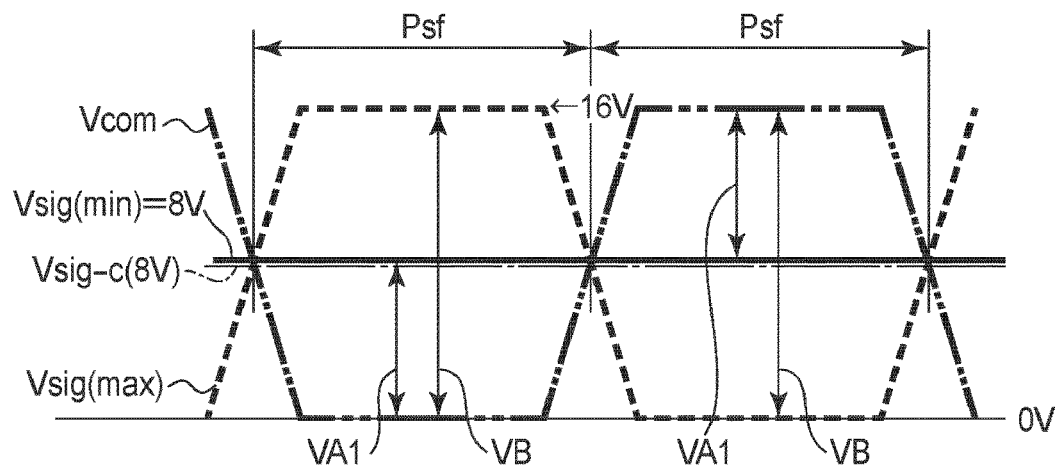
FIG. 12 is a timing chart showing an example of a common voltage and a signal line voltage in display driving.

FIG. 12 is a timing chart showing an example of the relationship between the common voltage Vcom supplied to the common electrode CE and the image signal Vsig supplied to the signal line S (or the pixel electrode PE) in the display driving to which the subframe inversion driving shown in FIG. 11 is applied.

FIG. 12 shows a waveform corresponding to the maximum value (max) of gradation and a waveform corresponding to the minimum value (min) of gradation for the image signal Vsig. The waveform of the image signal Vsig (min) is indicated by a solid line, the waveform of the common voltage Vcom is indicated by an alternate long and two short dashes line, and the waveform of the image signal Vsig (max) is indicated by a dashed line. In the example of this figure, the polarities of the common voltage Vcom and the image signal Vsig (see the waveform of the maximum value) are inverted for each subframe period Psf. The reference voltage Vsig-c is, for example, 8 V. In each of the common voltage Vcom and image signal Vsig, the lower limit value is 0 V and the upper limit value is 16 V.

However, in the case of the frame inversion driving, the polarity of the common voltage Vcom and the polarity of the image signal Vsig are inverted for each frame period.

Paying attention to the polarity inversion driving including not only the example shown in FIG. 12 but also the example of FIG. 13 to be described later, when the polarity of a drive voltage applied to the liquid crystal layer 30 (a voltage to be written to the pixel PX) is positive, a difference between the image signal Vsig and the common voltage Vcom (Vsig−Vcom) corresponds to 0 V or a positive voltage value. On the other hand, when the polarity of a drive voltage applied to the liquid crystal layer 30 (a voltage written to the pixel PX) is negative, the difference (Vsig−Vcom) corresponds to 0 V or a negative voltage value.

Paying attention to the polarity inversion driving shown in FIG. 12, in a period during which a positive voltage is written to the pixel PX, the common voltage Vcom becomes 0 V, and the image signal Vsig has a voltage value corresponding to the gradation indicated by image data in a range of 8 V or more and 16 V or less. In a period during which a negative voltage is written to the pixel PX, the common voltage Vcom becomes 16 V, and the image signal Vsig has a voltage value corresponding to the gradation indicated by image data in a range of 0 V or more and 8 V or less. In either case, a voltage of 8 V or more and 16 V or less is applied between the common electrode CE and the pixel electrode PE.

As shown in FIG. 10, even though the voltage VLC applied to the liquid crystal layer 30 is 8 V, or even though a first transparent voltage VA1 is applied to the liquid crystal layer 30, the liquid crystal layer 30 has a degree of scattering of about 0% to 10%. Therefore, even when the image signal Vsig is set to the minimum value of gradation, external light incident upon the display panel PNL is slightly scattered, with the result that the visibility of the background of the display panel PNL may be lowered.

Therefore, as will be described later, the visibility of the background of the display panel PNL can be improved by taking transparent driving (driving during a reset period to be described later), which makes the voltage between the pixel electrode PE and the common electrode CE smaller than, for example, the lower limit value of gradation, into the sequence of image display.

Here is a description of the relationship between the outputs of the signal line driving circuits SD1, SD2 and SD3 and the common voltage Vcom.

When the withstand voltages of the signal line driving circuits SD1, SD2 and SD3 are low, the common voltage Vcom is inverted to increase a liquid crystal application voltage. At this time, the signal line driving circuits SD1, SD2 and SD3 can simultaneously output either of the positive-polarity image signal Vsig (for example, reference voltages Vsig-c to 16 V) and the negative-polarity image signal Vsig (for example, 0 V to reference voltage Vsig-c). The polarity of the common voltage Vcom is opposite to that of the output of the signal line driving circuit SD.

However, when the signal line driving circuits SD1, SD2 and SD3 whose withstand voltage is high are used, the relationship between the image signal Vsig and the common voltage Vcom may be the one described above, but may be the following. That is, the common voltage Vcom is fixed at 0 V, and the image signal Vsig output from the signal line driving circuits SD1, SD2 and SD3 is 0 to +16 V in positive polarity and −16 to 0 V in negative polarity.

Figure 13:
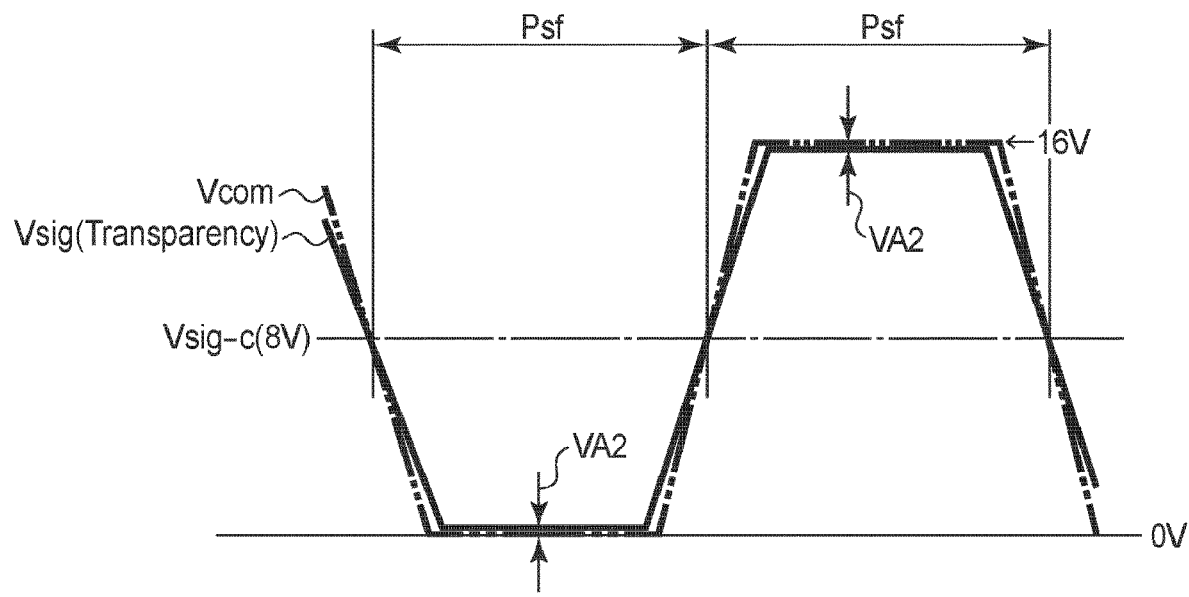
FIG. 13 is a timing chart showing an example of a common voltage and a signal line voltage in transparent driving.

FIG. 13 is a timing chart showing an example of the common voltage Vcom and the image signal Vsig in the transparent driving. In this chart, the waveform of the image signal Vsig is indicated by a solid line, and the waveform of the common voltage Vcom is indicated by an alternate long and two short dashes line.

Like in the example of FIG. 12, the common voltage Vcom switches alternately between 0 V and 16 V for each subframe period Psf as shown in FIG. 13. In the transparent driving, the voltage value of the image signal Vsig coincides with the common voltage Vcom for each subframe period Psf (Vsig=Vcom=0 V or Vsig=Vcom=16 V). In FIG. 13, the image signal Vsig and the common voltage Vcom are slightly shifted from each other in terms of illustration. Thus, 0 V is applied to the liquid crystal layer 30. In other words, the second transparent voltage VA2 is applied to the liquid crystal layer 30.

However, the image signal Vsig in the transparent driving is not limited to the example shown in FIG. 13. For example, the image signal Vsig may be more than 0 V and less than 8 V (0 V<Vsig<8 V) during a period in which the common voltage Vcom is 0 V. The image signal Vsig may be more than 8 V and less than 16 V (8 V<Vsig<16 V) during a period in which the common voltage Vcom is 16 V. In either case, according to the transparent driving, the absolute value of the difference between the image signal Vsig and the common voltage Vcom is less than 8 V, and the parallelism of light transmitted through the liquid crystal layer 30 is increased. In other words, the second transparent voltage VA2 is not limited to 0 V, and the absolute value of the second transparent voltage VA2 may be less than 8 V.

In the transparent driving, the voltage applied to the liquid crystal layer 30 has only to be less than the lower limit (e.g., 8 V) of the gradation, and the image signal Vsig need not completely coincide with the common voltage Vcom. As described above, the highest degree of scattering of light that enters the liquid crystal layer 30 when a scattering voltage VB is applied to the liquid crystal layer 30 is set to 100%. For example, the second transparent voltage VA2 is preferably a voltage at which the degree of scattering is less than 10%.

FIG. 14 is a timing chart showing another example of the common voltage Vcom and the image signal Vsig in the transparent driving. In this chart, the waveform of the image signal Vsig is indicated by a solid line, and the waveform of the common voltage Vcom is indicated by an alternate long and two short dashes line.

As shown in FIG. 14, the polarity inversion of the common voltage Vcom and the image signal Vsig is stopped in the transparent driving. Further, the common voltage Vcom and the image signal Vsig coincide with each other at 8 V (the reference voltage Vsig-c described above). Note that the common voltage Vcom and the image signal Vsig may coincide with each other at a voltage other than the reference voltage Vsig-c, such as 0 V. Like in the case shown in FIG. 13, the scattering degree of the second transparent voltage VA2 is preferably less than 10%.

The transparent driving has been so far described taking the subframe inversion driving as an example, but the same transparent driving can be applied to other polarity inversion driving.

An example of control of the display device DSP adopting the transparent scanning will be described below with reference to FIGS. 15 to 19. In this example, the field sequential system is applied to the display device DSP as a driving method. During each subframe period, red, green and blue images are displayed. The images of the respective colors displayed in time division are combined to be visually recognized by a user as a multicolor display image.

Figure 15:
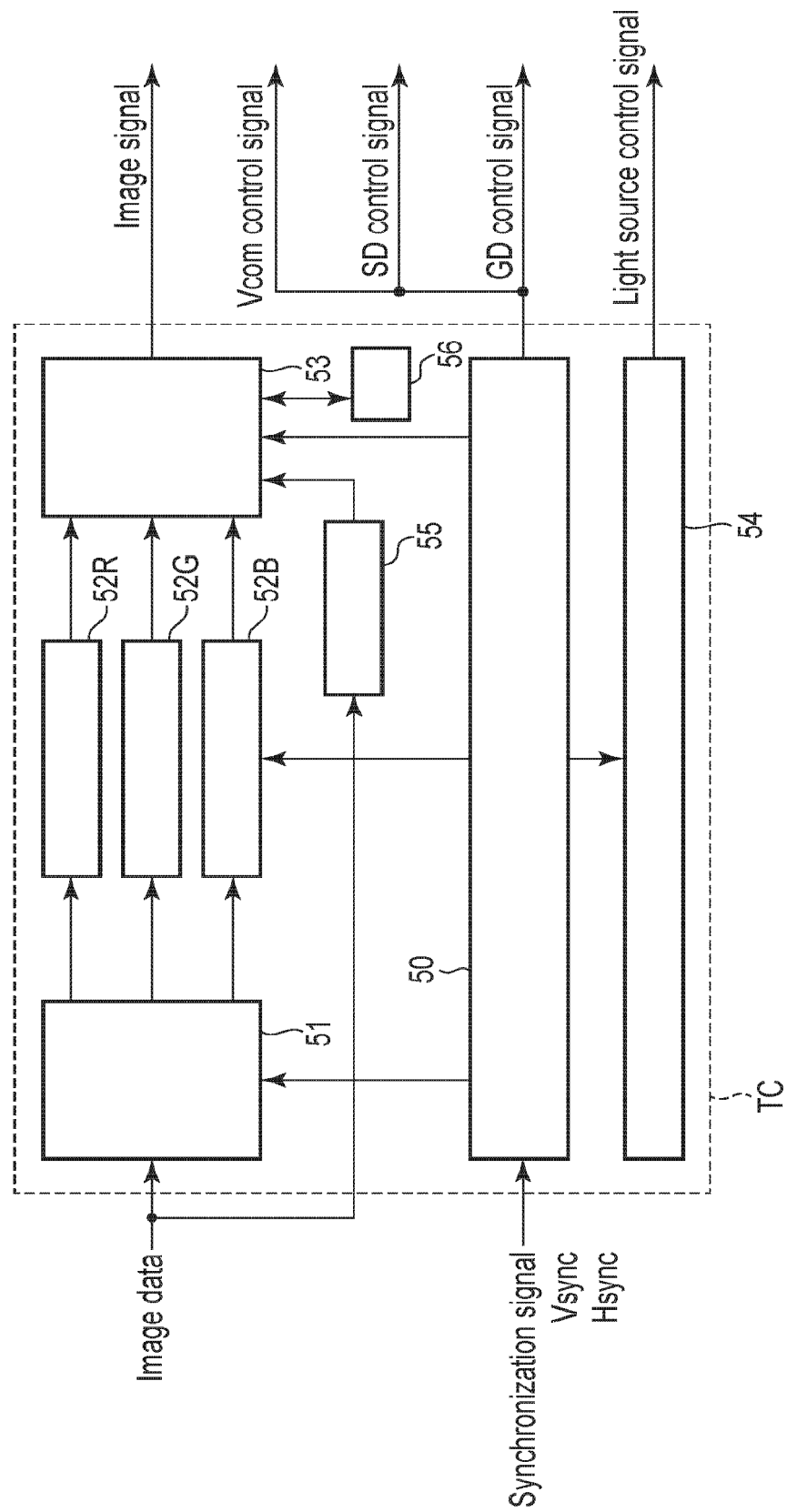
FIG. 15 is a diagram showing a configuration example of a timing controller shown in FIG. 3.

FIG. 15 is a diagram showing a configuration example of the timing controller TC shown in FIG. 3.

As shown in FIG. 15, the timing controller TC includes a timing generator 50, a frame memory 51, line memories 52R, 52G and 52B, a data converter 53, a light source controller 54, and a detector 55 serving as an address detector.

The frame memory 51 stores image data for one frame which is externally supplied. The line memories 52R, 52G and 52B store red, green and blue subframe data items, respectively. Each of the subframe data items represents a red image, a green image and a blue image to be displayed in time division in each pixel PX (e.g., a gradation value of each pixel PX). The subframe data items of respective colors stored in the line memories 52R, 52G and 52B corresponds to a frame that is one ahead of the frame for the image data stored in the frame memory 51. The data converter 53 performs various data conversion processes, such as gamma correction, for the subframe data items of respective colors stored in the line memories 52R, 52G and 52B to generate an image signal, and outputs it to the signal line driving circuit SD. Note that the timing controller TC may be configured such that the frame memory 51 sorts the RGB data and sends the RGB data to the data converter 53. In this case, the timing controller TC can be configured without using the line memories 52R, 52G and 52B.

The light source controller 54 outputs a light source control signal to the light source driver LSD. The light source driver LSD drives the light emitting elements LSR, LSG and LSB based on the light source control signal. The light emitting elements LSR, LSG and LSB can be driven by pulse width modulation (PWM) control, for example. That is, the light source driver LSD can adjust the luminance of each of the light emitting elements LSR, LSG and LSB according to the duty ratio of signals supplied to the light emitting elements LSR, LSG and LSB.

The timing generator 50 controls the operation timing of the frame memory 51, the line memories 52R, 52G 52B, the data converter 53 and the light source controller 54 in synchronization with a vertical synchronization signal Vsync and a horizontal synchronization signal Hsync which are externally input. Also, the timing generator 50 outputs an SD control signal to control the signal line driving circuit SD, outputs a GD control signal to control the scanning line driving circuit GD, and outputs a Vcom control signal to control the Vcom circuit VC.

The detector 55 is so configured to detect the address of data of image when the data of image is included in image data for one frame which is externally input. The image is a character displayed in part of the display area DA. Examples of the character include symbols including characters, figures, icons and the like. When the image data includes character data, at least one of all bits of digital data includes data other than 0. The address information of the image data is supplied to the data converter 53.

Since, therefore, the timing controller TC adjusts the degree of scattering (transparency) of an area other than the area where an image is displayed when data of the image is included in externally input image data, it generates a processed image signal and outputs it to the signal line driving circuit SD. To generate the processed image signal, the data converter 53 can perform arithmetic operation and use data stored in a table 56 of the timing controller TC.

Here is a description of an example of adjusting the degree of scattering (transparency) of an area other than the area where an image (character) is displayed.

Assume that a user views Mount F of the background through the display device DSP as shown in FIG. 16. If an image CR of character string "Mount F" is simply displayed in the display area DA, the image CR overlaps Mount F of the background, which may make it difficult for the user to visually recognize (identify) the image CR. The present embodiment therefore provides a technique of making it easy for the user to visually recognize the image CR even though the image CR overlaps Mount F of the background. Alternatively, it provides a technique of making the user unsusceptible to the influence of the background.

Assume here that in the display area DA, an area for displaying the image CR is a target area OA. Since, in the present embodiment, the image CR is six characters arranged at intervals, the target area OA is a discontinuous area. Assume that in the display area DA, an area including at least the entire area of a row where the target area OA is located is a rewrite area RA. In the present embodiment, the rewrite area RA includes not only the entire area of the row where the target area OA is located, but also the entire area of several rows closer to the side En1 than the target area OA and the entire area of several rows closer to the side En2 than the target area OA. In this example, the rewrite area RA is a central area of the display area DA in the second direction Y. On the rewrite area RA, an area other than the target area OA will be defined as a non-target area NOA.

The target area OA is an area corresponding to a pixel to which a scattering voltage VB that is equal to or higher than a predetermined voltage of a gradation voltage is applied. The non-target area NOA is an area corresponding to a pixel to which the first transparent voltage VA1 is applied. Note that the first transparent voltage VA1 is a voltage in a predetermined range close to a point that is capable of gradation expression of the gradation voltage. An area other than the rewrite region RA in the display area DA will be defined as a non-rewrite area NRA.

In this example, the display area DA has a non-rewrite area NRA1 closer to the side En1 than the rewrite area RA and a non-rewrite area NRA2 closer to the side En2 than the rewrite area RA. As described above, the scattering voltage VB or the first transparent voltage VA1 is applied to the pixels in the rewrite area RA, and the second transparent voltage VA2 is applied to the pixels in the non-rewrite areas NRA1 and NRA2.

FIG. 17 shows only parts of the display panel PNL required for description. FIG. 17 shows an optical path and also shows the diffusion of light in the liquid crystal layer 30 and the maintenance of parallelism of light in the liquid crystal layer 30. FIG. 18 shows an equivalent circuit of the pixels shown in FIG. 17 and also shows the relationship in connection among the scanning lines Ga and Gb, the signal lines S, the switching elements SWA, SWB and SWC, and the pixel electrodes PEA, PEB and PEC. FIG. 18 shows neither the liquid crystal layer 30 nor the common electrode CE.

As shown in FIGS. 17 and 18, the pixel electrodes PE include a pixel electrode PEA located in the target area OA, a pixel electrode PEB located in the non-target area NOA and a pixel electrode PEC located in the non-rewrite area NRA2 (NRA). Assume here that the scanning line G for the pixel PX located in the rewrite area RA is a scanning line Ga. Also, assume that the scanning line G for the pixel PX located in the non-rewrite area NRA is a scanning line Gb.

Each of the pixel electrodes PEA and PEB is electrically connected to a corresponding one of a plurality of scanning lines Ga. For example, the pixel electrodes PEA and PEB are electrically connected to the same scanning line Ga. The pixel electrode PEC is electrically connected to a corresponding one of a plurality of scanning lines Gb. In each switching element SW, the gate electrode is connected to a corresponding scanning line G, one of the source and drain electrodes is connected to a corresponding signal line S, and the other is connected to a corresponding pixel electrode PE.

The liquid crystal layer 30 (display function layer) includes a liquid crystal layer 30A to which a voltage, which is to be applied between the pixel electrode PEA and the common electrode CE, is applied, a liquid crystal layer 30B to which a voltage, which is to be applied between the pixel electrode PEB and the common electrode CE, is applied, and a liquid crystal layer 30C to which a voltage, which is to be applied between the pixel electrode PEC and the common electrode CE, is applied. In the present embodiment, the liquid crystal layer 30A is sandwiched between the pixel electrode PEA and the common electrode CE, the liquid crystal layer 30B is sandwiched between the pixel electrode PEB and the common electrode CE, and the liquid crystal layer 30C is sandwiched between the pixel electrode PEC and the common electrode CE.

The pixels PX include a pixel PXA, a pixel PXB and a pixel PXC. The pixel PXA includes a switching element SWA, a pixel electrode PEA connected to the switching element SWA, a liquid crystal layer 30A, and the like. The pixel PXB includes a switching element SWB, a pixel electrode PEB connected to the switching element SWB, a liquid crystal layer 30B, and the like. The pixel PXC includes a switching element SWC, a pixel electrode PEC connected to the switching element SWC, a liquid crystal layer 30C, and the like.

The liquid crystal layer 30 (liquid crystal layers 30A, 30B and 30C) scatters the light incident upon application of the scattering voltage VB, maintains the parallelism of the light incident upon application of the first transparent voltage VA1, and maintains the parallelism of the light incident upon application of the second transparent voltage VA2.

The parallelism of light transmitted through the liquid crystal layer 30 when the second transparent voltage VA2 is applied is higher than that of light transmitted through the liquid crystal layer 30 when the first transparent voltage VA1 is applied. The parallelism of light transmitted through the liquid crystal layer 30 when the first transparent voltage VA1 is applied is higher than that of light transmitted through the liquid crystal layer 30 when the scattering voltage VB is applied.

The degree of scattering of light transmitted through the liquid crystal layer 30 when the scattering voltage VB is applied is higher than that of light transmitted through the liquid crystal layer 30 when the first transparent voltage VA1 is applied. The degree of scattering of light transmitted through the liquid crystal layer 30 when the first transparent voltage VA1 is applied is higher than that of scattering of light transmitted through the liquid crystal layer 30 when the second transparent voltage VA2 is applied.

As shown in FIGS. 16 to 18, when an image CR is displayed in the target area OA of the display area DA, the driver DR of the present embodiment displays the image CR in the target area OA to make the non-target area NOA transparent and make the non-rewrite area NRA transparent. The transparency of the non-rewrite area NRA is higher than that of the non-target area NOA. In the present embodiment, the liquid crystal layer 30 uses reverse polymer dispersed liquid crystal; thus, the first transparent voltage VA1 is higher than the second transparent voltage VA2, and the scattering voltage VB is higher than the first transparent voltage VA1. However, when, unlike in the present embodiment, the liquid crystal layer 30 uses normal polymer dispersed liquid crystal, the first transparent voltage VA1 is higher than the scattering voltage VB, and the second transparent voltage VA2 is higher than the first transparent voltage VA1.

Thus, the controller applies the scattering voltage VB to the liquid crystal layer 30A, applies the first transparent voltage VA1 to the liquid crystal layer 30B, and applies the second transparent voltage VA2 to the liquid crystal layer 30C. Paying attention to one frame of the period during which an image CR is displayed in the target area OA, the driver DR drives the light source unit LU to irradiate the liquid crystal layer 30 with light, applies the scattering voltage VB to the liquid crystal layer 30A, applies the first transparent voltage VA1 to the liquid crystal layer 30B, and applies the second transparent voltage VA2 to the liquid crystal layer 30C, during a period in which the liquid crystal layer 30 is irradiated with light.

The color of the image CR (the color displayed in the target area OA) is based on the color generated from the light source unit LU. For this reason, the driver DR can make the color of the image CR a single color emitted from the light source unit LU or can make a color mixture of a plurality of colors emitted from the light source unit LU. It can also display all images CR in a single color or display parts of each image CR in different colors.

The degree of light scattering of the liquid crystal layer 30A is higher than that of light scattering of each of the liquid crystal layer 30B and the liquid crystal layer 30C. The liquid crystal layer 30A is rendered in a scattering state. Therefore, when the background is viewed through the display panel PNL, the visibility of the background can be reduced most in the target area OA.

On the other hand, the parallelism of light transmitted through the liquid crystal layer 30C is higher than that of light transmitted through each of the liquid crystal layer 30A and the liquid crystal layer 30B. The liquid crystal layer 30C is rendered in a second transparent state. Therefore, when the background is viewed through the display panel PNL, the visibility of the background in the non-rewrite area NRA is the best.

The liquid crystal layer 30B is also rendered in a first transparent state. However, the degree of scattering of light transmitted through the liquid crystal layer 30B is higher than that of light transmitted through the liquid crystal layer 30C. When the background is viewed through the display panel PNL, it can be blurred in the non-target area NOA, and its visibility in the non-target area NOA can be reduced, with the result that the user can easily see the image CR.

Figure 19:
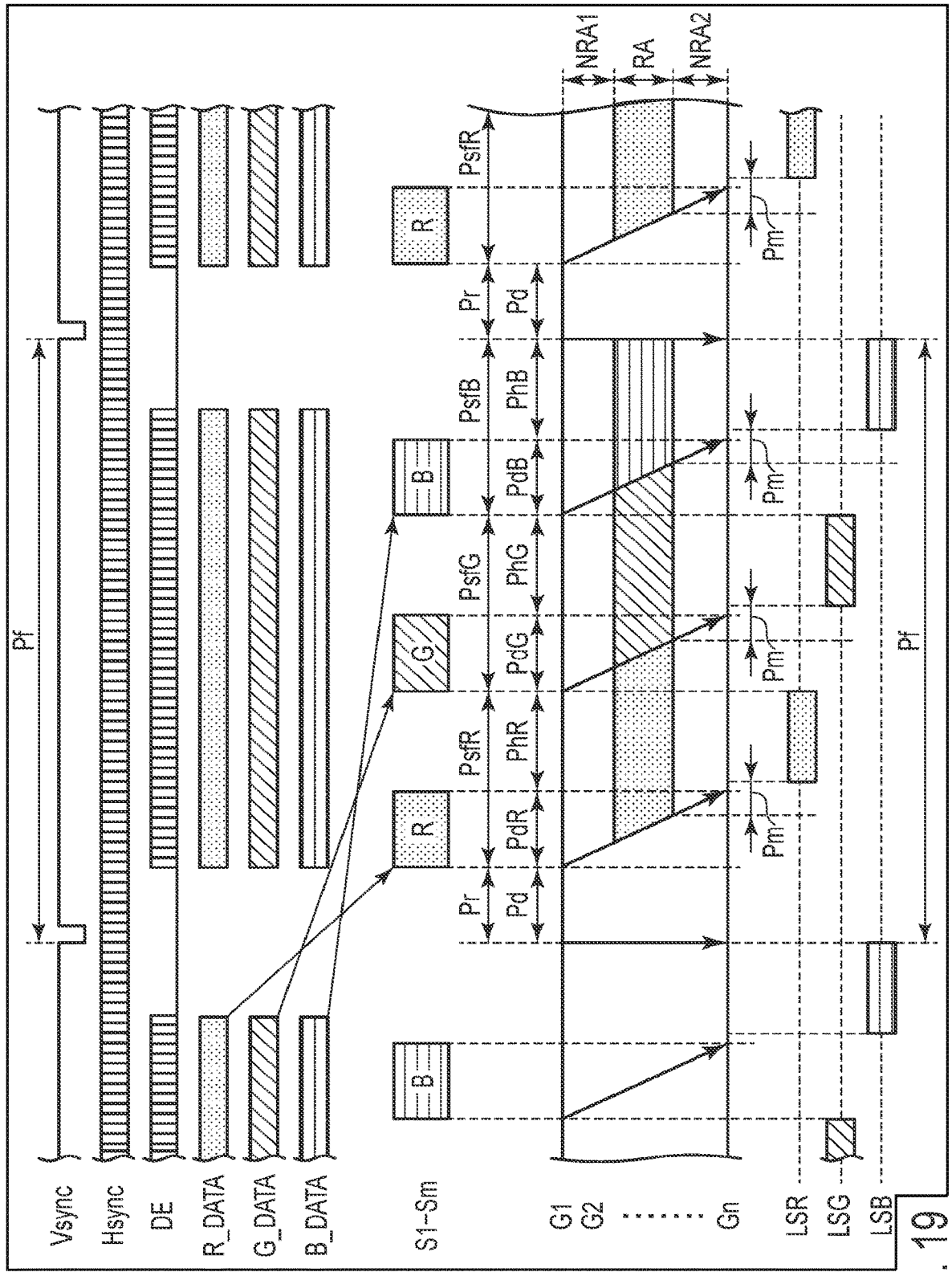
FIG. 19 is a timing chart showing an example of a display operation.

FIG. 19 is a timing chart showing an example of display operation of the display device DSP according to the present embodiment.

As shown in FIG. 19, the vertical synchronization signal Vsync falls at the start of one frame. That is, in this example, the time from when the vertical synchronization signal Vsync falls until it falls again corresponds to a frame period (one frame period) Pf. When the display device DSP is driven at, for example, 60 Hz, the frame period Pf is about 16.7 ms.

The frame period Pf includes a reset period Pr for executing the transparent driving, a first subframe period PsfR, a second subframe period PsfG and a third subframe period PsfB. Each subframe period Psf corresponds to a period during which the display driving is executed. In this example, the reset period Pr is a top period of the frame period Pf. The reset period Pr, the first subframe period PsfR, the second subframe period PsfG and the third subframe period PsfB follow in this order. However, unlike in this example, the reset period Pr is not the top period of the frame period Pf but may be the last period of the frame period Pf.

In the reset period Pr, the transparent driving is executed under the control of the timing controller TC. That is, the scanning line driving circuit GD simultaneously supplies the H-level control signal Ca to all the scanning lines G.

Alternatively, the scanning line driving circuit GD may supply the H-level control signal Ca in sequence from the scanning line G1 to the scanning line Gn.

Furthermore, during the reset period Pr, the signal line driving circuit SD supplies the image signal Vsig having the same value as that of the common voltage Vcom to all the signal lines S. With this operation, the second transparent voltage VA2 is written between the common electrode CE and the pixel electrodes PE of all the pixels PX. After that, the pixel electrode PE of each of the pixels PX is rendered in an electrically floating state until the next image signal Vsig is supplied. Thus, in the pixel PX to which the second transparent voltage VA2 is written, the second transparent voltage VA2 is held until the next image signal Vsig is supplied.

In the pixel PX to which the second transparent voltage VA2 is written, the liquid crystal layer 30 is satisfactorily in the second transparent state and thus the visibility of the background of the display panel PNL is enhanced. In the present embodiment, during the reset period Pr, the light emitting elements LSR, LSG and LSB are all turned off. It is preferable that the light emitting elements LSR, LSG and LSB are turned off during the reset period Pr, but they may be turned on during the reset period Pr.

During the reset period Pr, the image signal Vsig supplied to each of the signal lines S1 to S2$m$ need not be the same as the common voltage Vcom if the voltage written to each pixel PX is a value of the second transparent voltage VA2. Various aspects described with reference to FIGS. 13 and 14 can be applied to the common voltage Vcom and the image signal Vsig in the transparent driving.

In the reset period Pr, the period during which the H-level control signals Ca are collectively applied to all the scanning lines G is a driving period Pd. For example, the length of the driving period Pd is 5 to 10 horizontal scanning periods. By securing the driving period Pd for a certain period as described above, the potential of the pixel electrode PE and that of the common electrode CE each can be shifted to a desired value. Since, in the example shown, the first subframe period PsfR comes immediately after the driving period Pd, Pr is equal to Pd with respect to a time period. The reset period Pr may include a holding period for holding the second transparent voltage VA2 further after the driving period Pd.

The first subframe period PsfR, second subframe period PsfG and third subframe period PsfB follow in this order, but unlike in this example, the order of these subframe periods Psf may be different. In each of the subframe periods Psf, a timing generator 50 controls the frame memory 51, the line memories 52R, 52G and 52B and the data converter 53 in response to a data synchronization signal and performs display driving of each color using the detector 55 and the table 56.

The first subframe period PsfR includes a driving period PdR and a holding period PhR. In the driving period PdR, the scanning line driving circuit GD supplies the H-level control signal Ca in sequence to the scanning lines G1 to Gn in units of two.

In addition, during the driving period PdR, the signal line driving circuit SD supplies the signal lines S1 to S2$m$ with an image signal Vsig corresponding to red subframe data (R_DATA) stored in the line memory 52R. More specifically, the operation of simultaneously supplying the signal lines S1 to S2$m$ with the image signal Vsig of gradation corresponding to pixels PX of two rows supplied with the H-level control signal Ca, is repeated.

The image signal Vsig is supplied to the pixel electrode PE of a selected pixel PX through the switching element SW, and then the switching element SW is turned off to hold the potential of the pixel electrode PE. After that, a plurality of pixels PX in the next two rows are selected, and the same driving is performed.

With the foregoing operation, a voltage corresponding to red subframe data is written between the common electrode CE and the pixel electrode PE of each pixel PX.

The holding period PhR is a period from the completion of writing to all the pixels PX to the coming of the second subframe period PsfG. In this holding period PhR, the light emitting element LSR emits red light. The light emitting element LSR is turned on after a margin period Pm after the completion of writing to all the pixels PX in the rewrite area RA. When the light emitting element LSR is turned on, the margin period Pm need not be included, but preferably it is included. This is because a response period of liquid crystal can be secured. Accordingly, a red image is displayed in the display area DA.

The operations in the second and third subframe periods PsfG and PsfB are similar to that in the first subframe period PsfR. The pixels PX are driven in units of two rows.

The second subframe period PsfG includes a driving period PdG and a holding period PhG, and in the driving period PdG, a voltage corresponding to green subframe data (G_DATA) stored in the line memory 52G is written to the pixel PX in the rewrite area RA. At this time, a state where the second transparent voltage VA2 is applied to the pixel PX in the non-rewrite area NRA is maintained, the scattering voltage VB is applied to the pixel PX in the target area OA, and the first transparent voltage VA1 is applied to the pixel in the non-target region NOA. In the holding period PhG, the light emitting element LSG emits green light. Accordingly, a green image is displayed in the display area DA.

The third subframe period PsfB includes a driving period PdB and a holding period PhB. In the driving period PdB, a voltage corresponding to blue subframe data (B_DATA) stored in the line memory 52B is written to the pixel PX in the rewrite area RA. In the holding period PhB, the light emitting element LSB emits blue light. Accordingly, a blue image is displayed in the display area DA.

In a certain frame period Pf, image data to be displayed in the next frame period Pf is written to the frame memory 51. In addition, the subframe data of the line memories 52R, 52G and 52B whose writing to the pixel PX is completed is rewritten to the subframe data corresponding to the image data written to the frame memory 51.

Red, green and blue images displayed in time division in the first, second and third subframe periods PsfR, PsfG and PsfB are mixed to be visually recognized by a user as a multicolor display image CR. In the reset period Pr, the second transparent voltage VA2 is applied between the common electrode CE and the pixel electrode PE of each pixel PX. Providing the reset period Pr once every frame period Pf enhances the transparency of the display area DA and improves the visibility of the background of the display area DA. Note that the reset period Pr may be provided once for each of the frame periods Pf as described above. Alternatively, the reset period Pr and one subframe period Psf may be provided alternately. Alternatively, the reset period Pr and the subframe periods Psf may be provided alternately. From the viewpoint of suppression of defects in display such as image burn-in, the frequency of reset is preferably high.

When the reset period Pr is adjusted, not only the period until the potential of the pixel electrode PE and that of the common electrode CE change to a desired value as described above, but also the transparency of the display region DA may be taken into consideration.

The greater the ratio of the reset period Pr in the frame period Pf, the greater the transparency of the display area DA. However, the visibility of an image may be lowered. In consideration of these, the length of the reset period Pr is preferably ½ or less of the length of one frame period Pf, for example. If, however, transparency is emphasized, the ratio of the reset period Pr in the frame period Pf may be made larger. The lengths of the first, second and third subframe periods PsfR, PsfG and PsfB may be the same, for example. The color chromaticity of displayed images may be adjusted by varying the ratio of the first, second and third subframe periods PsfR, PsfG and PsfB.

Next is a description of a display operation of displaying an image CR, as shown in FIG. 16, during one frame period using the display operation shown in FIG. 19.

As shown in FIGS. 16 to 19, the driver DR applies the second transparent voltage VA2 to each of the first, second and third liquid crystal layers 30A, 30B and 30C during the reset period Pr, and switches the light source unit LU to an off state in which the liquid crystal layer 30 is not irradiated with light. The driver DR applies the first transparent voltage VA1 to the second liquid crystal layer 30B and holds a state in which the second transparent voltage VA2 is applied to the third liquid crystal layer 30C, during all of the first, second and third subframe periods PsfR, PsfG and PsfB. The driver DR applies a scattering voltage VB to the liquid crystal layer 30A in at least one of the first, second and third subframe periods PsfR, PsfG and PsfB.

Here is a description of application of the polarity inversion driving to the display operation described above.

As shown in FIGS. 16 to 19, the scattering voltage VB includes a positive scattering voltage and a negative scattering voltage (FIG. 12). The positive scattering voltage is, for example, 8 V to 16 V and the negative scattering voltage is, for example, −16 V to −8 V. When displaying an image CR in the target area OA, the driver DR alternately applies a positive scattering voltage VB and a negative scattering voltage VB to the liquid crystal layer 30A for each subframe period Psf. The driver DR alternately applies a positive first transparent voltage VA1 and a negative first transparent voltage VA1 to the liquid crystal layer 30B for each subframe period Psf.

The positive first transparent voltage VA1 and the absolute value of the negative first transparent voltage VA1 are half of the maximum value of the positive scattering voltage VB and half of the maximum value of the absolute value of the negative scattering voltage VB, respectively. For example, in the example shown in FIG. 12, the positive first transparent voltage VA1 and the absolute values of the negative first transparent voltage VA1 are each 8 V, and the maximum value of the positive scattering voltage VB and the maximum value of the absolute value of the negative scattering voltage VB are each 16 V. For example, regardless of the polarity of the first transparent voltage VA1 and the scattering voltage VB, the absolute value of the first transparent voltage VA1 is half of the maximum value of the absolute value of the scattering voltage VB. However, the positive and negative first transparent voltages VA1 are not limited to the above example, but may be a voltage whose degree of scattering is 50% or less.

According to the display device DSP according to the first embodiment configured as described above, the driving method of the display device DSP is a field sequential system. In the above driving method, it is necessary to write image signals Vsig of three colors of red, green and blue per frame period Pf in the pixel PX at a high speed.

In the present embodiment, therefore, the scanning line G is not provided in the same layer as the coupling portion LC. The scanning line G is provided in the same layer as the line portion LI of the signal line S and is formed of the same material as the line portion LI to have a low resistance. The signal line S is based on a low-resistance line portion LI, and the coupling portion LC is used only at a portion when the signal line S and the scanning line G intersect each other. Thus, the resistance of the signal line S is lowered.

As compared with the case where the scanning line G is formed of the same material as the coupling portion LC, the load of the scanning line G can be decreased. Using the line portion LI as the basis of the signal line S, it is possible to avoid a situation in which the load of the signal line S is increased. The image signal can thus be written to the pixel PX at a high speed. Since insufficient writing of the image signal Vsig to the pixel electrode PE can be suppressed, deterioration of display quality such as generation of non-uniformity in display, reduction of contrast and occurrence of flicker can be suppressed.

The gate electrode GE of the switching element SW is provided in the same layer as the coupling portion LC and is formed of the same material as the coupling portion LC. Even though the scanning line G and the signal line S are configured as described above, the configuration of the switching element SW need not be changed. For example, the materials of the semiconductor layer SC and the gate electrode GE need not be changed. It is thus possible to avoid a situation in which the electrical characteristics of the switching element SW are changed. In addition, the switching elements SW, the scanning lines G and the signal lines S can be formed in the same manufacturing process as conventional. For example, a third wiring line need not be newly used to form the scanning lines G and the signal lines S. It is thus possible to prevent manufacturing costs from increasing.

From the above, a display device capable of switching between a transparent state and a scattering state can satisfactorily be provided.

Second Embodiment

Next is a description of a second embodiment. FIG. 20 is a plan view showing part of a display panel PNL of a display device DSP according to the present embodiment, showing one pixel PX.

Figure 20:
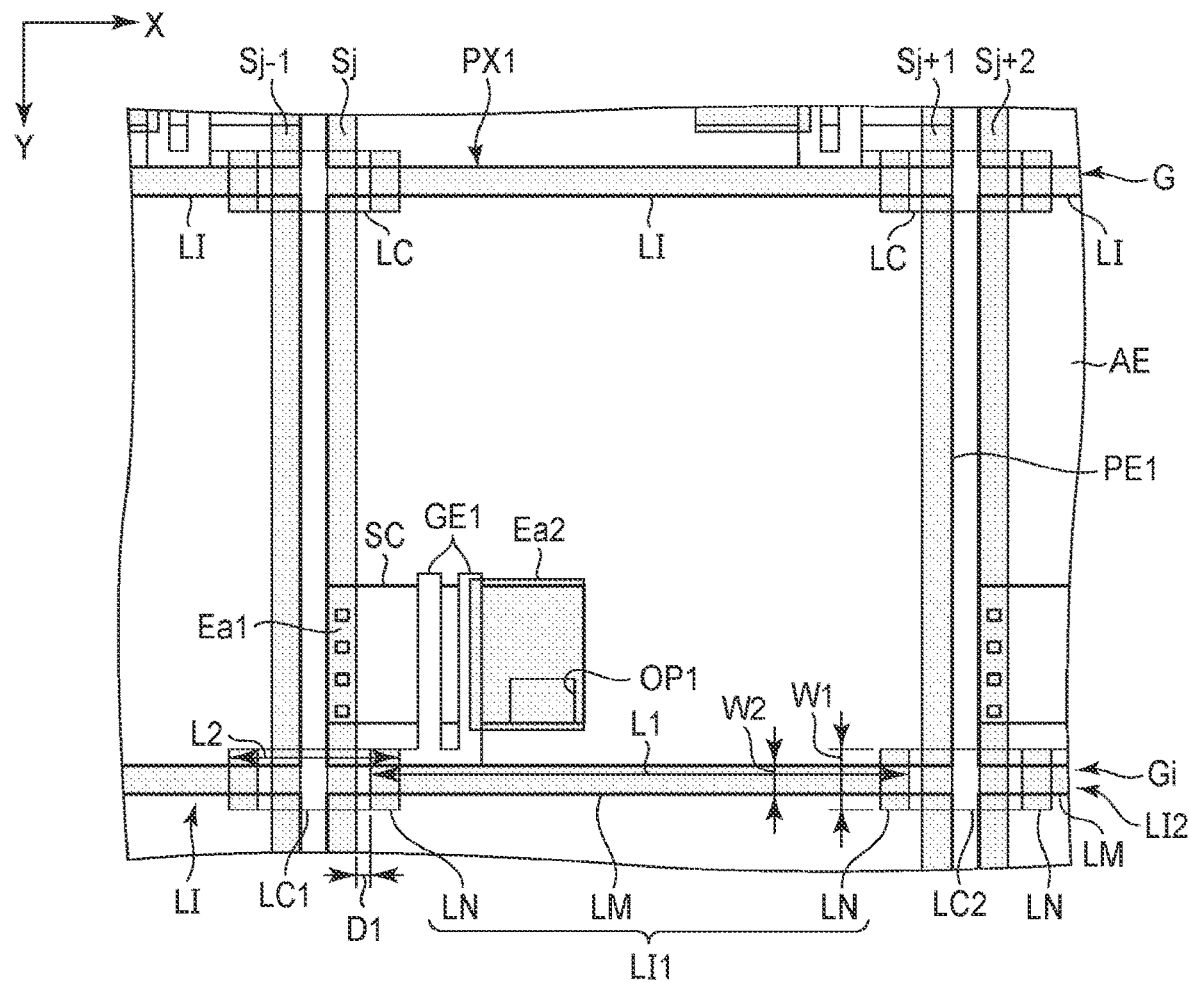
FIG. 20 is a plan view showing part of a display panel of a display device according to a second embodiment, and showing one pixel.

As shown in FIG. 20, the present embodiment differs from the first embodiment in that instead of the signal line S, the scanning line G includes a plurality of coupling portions LC and a plurality of line portions LI. In the present embodiment, the auxiliary electrode AE has first openings OP1 and not second openings OP2. As shown in FIG. 5, however, the auxiliary electrode AE may have second openings OP2.

Each of the scanning lines G such as the first scanning line Gi includes a plurality of coupling portions LC and a plurality of line portions LI. Each of the line portions LI is located between the signal lines S. Hereinafter, a first scanning line Gi of a plurality of scanning lines G will be described. Note that the scanning lines G other than the first scanning line Gi are configured like the first scanning line Gi.

For example, the first scanning line Gi includes a first coupling portion LC1, a first line portion LI1, a second coupling portion LC2, a second line portion LI2, and the like. The first coupling portion LC1 extends in the first direction X. The first line portion LI1 extends in the first direction X and is electrically connected to the first coupling portion LC1. The second coupling portion LC2 extends in the first direction X. The second line portion LI2 extends in the first direction X, and is located between a first signal line Sj and a second signal line Sj+1 and electrically connected to the first and second coupling portions LC1 and LC2.

The line portion LI includes a single main line portion LM and two connecting portions LN. The main line portion LM extends in the first direction X. The connecting portions LN are provided continuously from the main line portion LM, overlaps the coupling portion LC, and is electrically connected to the coupling portion LC. The signal line S intersects the connecting portion LC. For example, the first signal line Sj intersects the first coupling portion LC1 of the first scanning line Gi. Paying attention to the coupling portion LC, the coupling portion LC intersects the two signal lines S.

The signal lines S and line portions LI are formed of the same material and are formed of a material other than the material of the coupling portions LC. The electric resistance value of each of the signal lines S and line portions LI is lower than that of each of the coupling portions LC.

In the present embodiment, the coupling portions LC are formed of molybdenum tungsten (MoW). However, as described above, the coupling portions LC may be formed of another metal such as Mo. Furthermore, in the present embodiment, the signal lines S and the line portions LI are each formed of TAT. However, the signal lines S and the line portions LI may be formed of metal other than TAT, such as MAM.

In the first direction X, the length L1 of the line portion LI is larger than the length L2 of the coupling portion LC. Assume here that in the first direction X, the interval between the first line portion LI1 (line portion LI) and the first signal line Sj (signal line S) is DI. Since the length L1 of the line portion LI is preferably larger, the interval DI is preferably in the range of 0.5 μm to 10 μm, more preferably in the range of 1.0 μm to 2.0 μm. This can therefore contribute to a reduction of electric resistance value (wiring resistance) of the scanning lines G. In the second direction Y, the width W1 of the coupling portion LC is larger than the width W2 of the main line portion LM.

The gate electrode GE and the coupling portion LC are formed of the same material and provided in the same layer. In the present embodiment, the gate electrode GE and the coupling portion LC are provided on the insulating layer 12 and are covered with the insulating layer 13 (FIG. 6). The single gate electrode GE and the single coupling portion LC are formed integrally with each other. For example, the gate electrode GE1 of the first switching element SW1 and the first coupling portion LC1 of the first scanning line Gi are formed integrally with each other.

The signal line S and the line portion LI are provided in the same layer. In the present embodiment, the signal line S and the line portion LI are provided on the insulating layer 13 and are covered with the insulating layer 14 (FIG. 6). The insulating layer 13 is interposed between the coupling portion LC and the signal line S.

Although not shown, like in the first embodiment (FIG. 5), in the present embodiment, too, the first substrate SUB1 includes a second switching element SW2 electrically connected to the second scanning line Gi+1 and the second signal line Sj+1, a second pixel electrode PE2 electrically connected to the second switching element SW2, and the like.

As shown in FIGS. 20 and 6, in the first direction X, the insulating layer (organic insulating film) 14 is in contact with a plurality of signal lines S such as the first signal line Sj and the second signal line Sj+1. As shown in FIGS. 20 and 7, in the second direction Y, the insulating layer 14 is in contact with a plurality of scanning lines G (line portions LI) such as the first scanning line Gi (line portion LI) and the second scanning line Gi+1 (line portions LI). In a region surrounded by the first signal line Sj, the second signal line Sj+1, the first scanning line Gi and the second scanning line Gi+1, the insulating layer 14 includes an insulating layer (organic insulating film) removing portion in a region which does not overlap the first switching element SW1.

In addition, like in the first embodiment (FIG. 6), the insulating layer (organic insulating film) 14 has a first surface 14a which is in contact with a plurality of signal lines S such as the first signal lines Sj and the second signal line, and a second surface 14b that is the opposite surface of the first surface 14a. The metal layer (metal wiring line) ME1 may be formed on the second surface 14b.

According to the display device DSP according to the second embodiment configured as described above, the line portion LI of the scanning line G is provided in the same layer as the signal line S and formed of the same material as signal line S to have a low resistance. In the present embodiment, the load on the scanning line G can be lowered. The load of the signal line S is not increased. Therefore, the present embodiment can also bring about the same advantages as those of the first embodiment.

From the above, a display device capable of switching between a transparent state and a scattering state can satisfactorily be provided.

(Modification)

Figure 21:
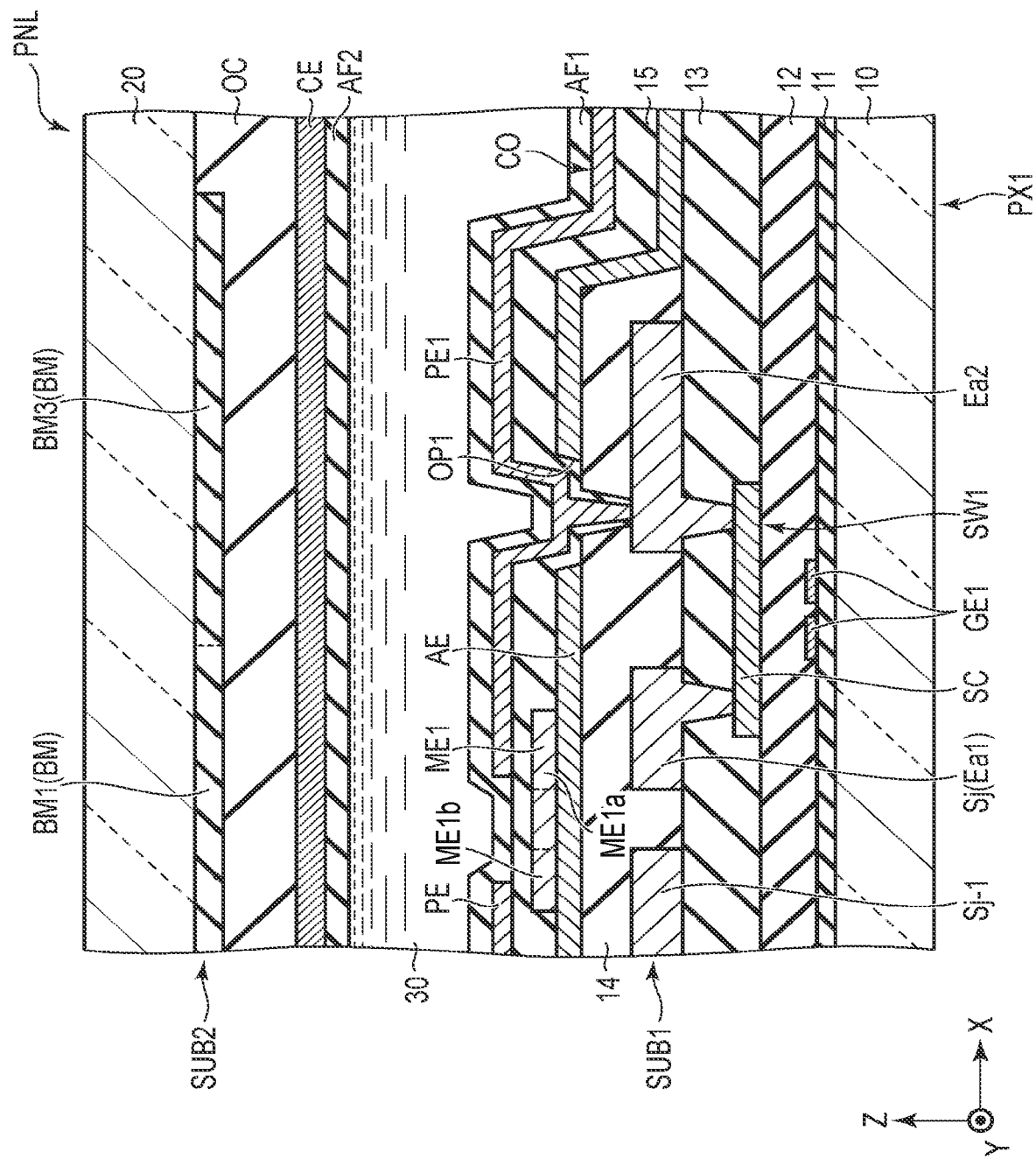
FIG. 21 is a sectional view showing part of a display panel of a display device according to a modification.

Next is a description of modifications to the first and second embodiments. FIG. 21 is a sectional view showing part of a display panel PNL of a display device DSP according to the present modification.

As shown in FIG. 21, the modification differs from the foregoing embodiments in that the switching element SW is configured by not a top-gate TFT but a bottom-gate TFT. The gate electrode GE is provided on the insulating layer 11 and covered with the insulating layer 12. The semiconductor layer SC is provided on the insulating layer 12 and covered with the insulating layer 13. The semiconductor layer SC is located between the gate electrode GE and the pixel electrode PE.

In this case, the coupling portion LC and the line portion LI of the signal line S shown in FIG. 5 are connected through a contact hole formed in the insulating films 12 and 13. Similarly, the coupling portion LC and the line portion LI of the gate wiring line G shown in FIG. 20 are connected through a contact hole formed in the insulating films 12 and 13.

The metal layer (metal wiring line) ME1 includes a first end portion ME1a superposed on the first signal line Sj and a second end portion ME1b superposed on the signal line Sj−1. The metal layer ME1 covers an interval between the first signal line Sj and the signal line Sj−1. The first pixel electrode PE1 overlaps the first signal line Sj and the first end portion ME1a.

The present modification can also bring about the same advantages as those of the foregoing embodiments.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions. If necessary, the embodiments can be combined.

In the foregoing embodiments, for example, a liquid crystal display device wherein the liquid crystal layer 30 utilizes PDLC and a method of driving the liquid crystal display device are disclosed. However, they can be applied to a variety of types of liquid crystal display device wherein the liquid crystal layer 30 utilizes no PDLC and a method of driving the liquid crystal display device. In addition, the embodiments are not limited to the liquid crystal display device and its driving method as a display device DSP and its driving method, but can be applied to any display device and its driving method. As a display device other than the liquid crystal display device, there is an electrophoretic device, for example.

What is claimed is:

1. A display device comprising:
   a first substrate including a first scanning line extending in a first direction, a first signal line extending in a second direction and intersecting the first scanning line, an insulating layer, a first switching element electrically connected to the first scanning line and the first signal line, and a first pixel electrode electrically connected to the first switching element;
   a second substrate including a common electrode and disposed opposite to the first substrate; and
   a display function layer which is held between the first substrate and the second substrate and is partly switched between a transparent state in which incident light is transmitted and a scattering state in which incident light is scattered by applying a voltage between the first pixel electrode and the common electrode,
   the first signal line including a first coupling portion extending in the second direction and a first line portion extending in the second direction and electrically connected to the first coupling portion,
   the first scanning line intersecting the first coupling portion and being provided in a same layer as the first line portion,
   the insulating layer being interposed between the first coupling portion and the first scanning line,
   the first substrate including:
      a second scanning line extending in the first direction, intersecting the first signal line, and located at a distance from the first scanning line in the second direction,
      a second signal line extending in the second direction, intersecting the first scanning line and the second scanning line, and located at a distance from the first signal line in the first direction,
      a second switching element electrically connected to the second scanning line and the second signal line, and
      a second pixel electrode electrically connected to the second switching element;
   the display function layer being partly switched between a transparent state in which incident light is transmitted and a scattering state in which incident light is scattered by applying a voltage between the second pixel electrode and the common electrode,
   the first pixel electrode and the second pixel electrode being located between the first signal line and the second signal line,
   the first scanning line being located between the first pixel electrode and the second pixel electrode,
   the first signal line further including a second coupling portion extending in the second direction, and a second line portion extending in the second direction, located between the first scanning line and the second scanning line and electrically connected to the first coupling portion and the second coupling portion,
   the second signal line including the first coupling portion, the first line portion, the second coupling portion, and the second line portion, and being configured similarly to the first signal line,
   the first scanning line intersecting the first coupling portion of the second signal line, and being provided in a same layer as the first line portion of the second signal line,
   the second scanning line intersecting the second coupling portion of the first signal line and the second coupling portion of the second signal line, and being provided in a same layer as the first line portion and the second line portion of each of the first signal line and the second signal line,
   the insulating layer being further interposed:
      between the second scanning line and the second coupling portion of the first signal line,
      between the first scanning line and the first coupling portion of the second signal line, and
      between the second scanning line and the second coupling portion of the second signal line.

2. The display device of claim 1, wherein
   the insulating layer includes a first surface, and a second surface opposed to the first surface,
   the first scanning line and the first line portion are formed of a same material and are in contact with the first surface,
   the second surface is in contact with the first coupling portion, and
   the first scanning line and the first line portion are formed of a material other than a material of the first coupling portion.

3. The display device of claim 1, wherein each of the first scanning line and the first line portion has an electric resistance value that is lower than an electric resistance value of the first coupling portion.

4. The display device of claim 1, wherein a length of the first line portion is greater than a length of the first coupling portion in the second direction.

5. The display device of claim 1, wherein an interval between the first line portion and the first scanning line is in a range of 0.5 μm to 10 μm in the second direction.

6. The display device of claim 1, wherein
   the first line portion includes a main line portion extending in the second direction, and a connecting portion provided continuously from the main line portion, superposed on the first coupling portion, and electrically connected to the first coupling portion, and
   a width of the first coupling portion is larger than a width of the main line portion in the first direction.

7. The display device of claim 1, wherein
   the first switching element includes
   a semiconductor layer electrically connected to the first line portion, and a gate electrode opposed to the semiconductor layer, electrically connected to the first scanning line, and provided in a same layer as the first coupling portion.

8. The display device of claim 7, wherein the gate electrode extends in the second direction.

9. The display device of claim 7, wherein the gate electrode and the first coupling portion are formed of a same material.

10. The display device of claim 7, wherein the first coupling portion is located in an area closer to the first scanning line than the semiconductor layer in the second direction.

11. The display device of claim 1, wherein the display function layer is a liquid crystal layer using polymer dispersed liquid crystal.

12. A display device comprising:
a first substrate including a first scanning line extending in a first direction, a first signal line extending in a second direction and intersecting the first scanning line, an insulating layer, a first switching element electrically connected to the first scanning line and the first signal line, and a first pixel electrode electrically connected to the first switching element;
a second substrate including a common electrode and disposed opposite to the first substrate; and
a display function layer which is held between the first substrate and the second substrate and is partly switched between a transparent state in which incident light is transmitted and a scattering state in which incident light is scattered by applying a voltage between the first pixel electrode and the common electrode,
the first scanning line including a first coupling portion extending in the first direction and a first line portion extending in the first direction, provided in a same layer as the first signal line, and electrically connected to the first coupling portion;
the first signal line intersecting the first coupling portion; and
the insulating layer being interposed between the first coupling portion and the first signal line,
the first switching element including:
a semiconductor layer electrically connected to the first signal line, and
a gate electrode opposed to the semiconductor layer, electrically connected to the first scanning line, and provided in a same layer as the first coupling portion;
the gate electrode being formed integrally with the first coupling portion,
the first substrate including:
a second scanning line extending in the first direction, intersecting the first signal line, and located at a distance from the first scanning line in the second direction,
a second signal line extending in the second direction, intersecting the first scanning line and the second scanning line, and located at a distance from the first signal line in the first direction,
a second switching element electrically connected to the second scanning line and the second signal line, and
a second pixel electrode electrically connected to the second switching element;
the display function layer being partly switched between a transparent state in which incident light is transmitted and a scattering state in which incident light is scattered by applying a voltage between the second pixel electrode and the common electrode,
the first pixel electrode and the second pixel electrode being located between the first signal line and the second signal line,
the first scanning line being located between the first pixel electrode and the second pixel electrode,
the first switching element being located close to the first signal line, and
the second switching element being located close to the second signal line.

13. The display device of claim 12, wherein
the first substrate includes
a third signal line adjacent to the first signal line, and
a metal line superposed on the first signal line and the third signal line, and extending in the second direction, and
the third signal line and the metal line intersect the first coupling portion.

14. The display device of claim 13, wherein
the metal line includes a first end portion superposed on the first signal line and a second end portion superposed on the third signal line, and
the metal line covers an interval between the first signal line and the third signal line.

15. The display device of claim 14, wherein the first pixel electrode overlaps the first signal line, and the first end portion of the metal line.

16. The display device of claim 15, wherein
the first substrate includes an organic insulating film formed in a lattice shape in planar view,
the organic insulating film is in contact with the first signal line and the second signal line in the first direction,
the organic insulating film is in contact with the first scanning line and the second scanning line in the second direction, and
the organic insulating film includes an organic insulating film removing portion in a region which does not overlap the first switching element, in a region surrounded by the first signal line, the second signal line, the first scanning line and the second scanning line.

17. The display device of claim 16, wherein
the organic insulating film includes a first surface that is in contact with the first signal line and the second signal line, and a second surface opposed to the first surface, and
the metal line is formed on the second surface.

* * * * *